(12) United States Patent
Hojo et al.

(10) Patent No.: US 9,221,207 B2
(45) Date of Patent: Dec. 29, 2015

(54) METHOD FOR PRODUCING LONG STRETCHED FILM

(75) Inventors: Daisuke Hojo, Kobe (JP); Shinji Inagaki, Tachikawa (JP); Shimpei Hatakeyama, Kobe (JP); Daisuke Ueno, Akashi (JP); Hiroshi Nanbu, Kobe (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

(21) Appl. No.: 14/376,561

(22) PCT Filed: Feb. 8, 2012

(86) PCT No.: PCT/JP2012/000845
§ 371 (c)(1),
(2), (4) Date: Aug. 4, 2014

(87) PCT Pub. No.: WO2013/118171
PCT Pub. Date: Aug. 15, 2013

(65) Prior Publication Data
US 2014/0353872 A1  Dec. 4, 2014

(51) Int. Cl.
*B29C 55/04* (2006.01)
*B29C 47/00* (2006.01)
*B29D 11/00* (2006.01)
*B29C 55/12* (2006.01)
*B29C 55/20* (2006.01)
*B29K 23/00* (2006.01)
*B29L 11/00* (2006.01)
(Continued)

(52) U.S. Cl.
CPC ......... *B29C 47/0057* (2013.01); *B29C 47/0021* (2013.01); *B29C 55/045* (2013.01); *B29C 55/12* (2013.01); *B29D 11/00644* (2013.01); *B29D 11/00788* (2013.01); *B29C 55/20* (2013.01); *B29K 2023/38* (2013.01); *B29K 2995/0034* (2013.01); *B29K 2995/0051* (2013.01); *B29K 2995/0097* (2013.01); *B29L 2011/0066* (2013.01); *B29L 2031/3475* (2013.01); *G02B 5/3033* (2013.01)

(58) Field of Classification Search
None
See application file for complete search history.

(56) References Cited

U.S. PATENT DOCUMENTS

| 6,511,756 B1 | 1/2003 | Obuchi et al. |
| 6,658,708 B2 * | 12/2003 | Fukuzawa et al. ............... 26/91 |
| 6,778,242 B1 | 8/2004 | Murayama et al. |

(Continued)

FOREIGN PATENT DOCUMENTS

| EP | 0-911-656 | 4/1999 |
| JP | H0-5-97978 | 4/1993 |

(Continued)

*Primary Examiner* — Jeffrey Wollschlager
(74) *Attorney, Agent, or Firm* — Lucas & Mercanti, LLP

(57) ABSTRACT

A method for producing a long stretched film according to one aspect of the present invention includes at least a film forming step of forming a long film made of thermoplastic resin, an oblique stretching step of obliquely stretching the long film and a winding step of winding the long stretched film after the oblique stretching step. The oblique stretching device includes gripping tool travel support tools at opposite sides of the traveling long film. Each of the gripping tool travel support tools includes a plurality of gripping tools. In the oblique stretching device, the gripping tool travel support tools provided at the opposite sides of the long film include the same number of gripping tools. A combination of the gripping tools forming a gripping tool pair is constantly the same at grip start points where the long film is gripped by the gripping tools.

10 Claims, 6 Drawing Sheets

(51) Int. Cl.
  *B29L 31/34* (2006.01)
  *G02B 5/30* (2006.01)

(56) References Cited

U.S. PATENT DOCUMENTS

| | | | | |
|---|---|---|---|---|
| 7,190,354 | B2 * | 3/2007 | Tanaka et al. | 345/173 |
| 7,473,446 | B2 * | 1/2009 | Ito et al. | 428/1.1 |
| 8,039,065 | B2 * | 10/2011 | Ikeda et al. | 428/1.32 |
| 8,097,200 | B2 * | 1/2012 | Asada | 264/291 |
| 8,208,105 | B2 * | 6/2012 | Itadani et al. | 349/117 |
| 2002/0008840 | A1 * | 1/2002 | Sakamaki et al. | 349/194 |
| 2003/0159259 | A1 * | 8/2003 | Fukuzawa et al. | 26/91 |
| 2004/0056380 | A1 * | 3/2004 | Fukuzawa et al. | 264/169 |
| 2004/0070041 | A1 * | 4/2004 | Obayashi et al. | 257/437 |
| 2004/0100708 | A1 * | 5/2004 | Noda et al. | 359/883 |
| 2004/0233363 | A1 | 11/2004 | Murayama et al. | |
| 2004/0241344 | A1 * | 12/2004 | Kawanishi et al. | 428/1.1 |
| 2006/0062934 | A1 | 3/2006 | Hayashi et al. | |
| 2006/0115610 | A1 * | 6/2006 | Nagashima | 428/1.3 |
| 2009/0130341 | A1 * | 5/2009 | Asada | 428/1.1 |
| 2009/0159857 | A1 | 6/2009 | Uehira et al. | |

FOREIGN PATENT DOCUMENTS

| | | | |
|---|---|---|---|
| JP | H05-310845 | | 11/1993 |
| JP | H10-45804 | | 2/1998 |
| JP | H11-124429 | | 5/1999 |
| JP | 2003-167121 | | 6/2003 |
| JP | 2004106423 | * | 4/2004 |
| JP | 2004-233604 | | 8/2004 |
| JP | 2005-121813 | | 5/2005 |
| JP | 2005-169856 | A | 6/2005 |
| JP | 2006-91836 | | 4/2006 |
| JP | 2006-215465 | | 8/2006 |
| JP | 2007-175974 | A | 7/2007 |
| JP | 2008-080674 | A | 4/2008 |
| JP | 2008-107767 | | 5/2008 |
| JP | 2009-078474 | A | 4/2009 |
| JP | 2010-031223 | | 2/2010 |
| JP | 2010-173261 | A | 8/2010 |
| JP | 2010-201659 | A | 9/2010 |
| JP | 2010-221624 | A | 10/2010 |

* cited by examiner

METHOD FOR PRODUCING LONG STRETCHED FILM

CROSS REFERENCE TO RELATED APPLICATION

This Application is a 371 of PCT/JP2012/000845 filed on Feb. 8, 2012, application which is incorporated herein by reference.

TECHNICAL FIELD

The present invention relates to a method for producing a long stretched film.

BACKGROUND ART

A stretched film formed by stretching resin is used as an optical film serving various optical functions in various display devices utilizing the optical anisotropy thereof. For example, in a liquid crystal display device, it is known to use the stretched film as an optical compensation film for preventing the coloring of the stretched film for optical compensation such as viewing angle expansion and use the stretched film as a phase difference film doubling as a polarizing plate protection film by bonding the stretched film and a polarizer.

On the other hand, in recent years, attention has been focused on self-luminous display devices such as organic electroluminescence display devices (hereinafter, also referred to as "organic EL displays") as new display devices. Self-luminance display devices can suppress power consumption as compared with liquid crystal display devices in which a backlight is constantly on. Further, in self-luminous display devices in which light sources corresponding to each color are respectively turned on such as organic EL displays, contrast can be further enhanced since it is not necessary to dispose color filters which cause a contrast reduction. However, since a reflector such as an aluminum plate is provided on the back side of the display in the organic EL display to enhance light extraction efficiency, there is a problem that outside light incident on the display reduces the contrast of an image by being reflected by this reflector. Thus, it is known to use a circular polarizing plate formed by bonding the stretched film and a polarizer on the front side of the display to improve brightness contrast by preventing outside light reflection. Further, such a circular polarizing plate is used also in so-called 3D liquid crystal display devices for displaying a stereoscopic image in some cases.

The above circular polarizing plate needs to be bonded in such an arrangement as to incline an in-plane slow axis of the stretched film at a desired angle with respect to an absorption axis of the polarizer.

However, a general polarizer (polarizing film) is obtained by being stretched at a high ratio in a conveying direction and the absorption axis coincides with the conveying direction. A conventional phase difference film is produced by being longitudinally or laterally stretched and, in principle, an in-plane slow axis is at 0° or 90° with respect to a longitudinal direction of the film. Thus, to set an angle of inclination between the absorption axis of the polarizer and the slow axis of the stretched film at a desired angle as described above, a long polarizing film and/or stretched film is conveyed and cut at a specific angle and film pieces have to be bonded one by one by a batch method, which has caused problems of deteriorated productivity and a reduction in the yield of products due to the adhesion of chips and the like. Particularly, in these latter days in which organic EL displays are being enlarged, if a method for obliquely conveying and cutting an obtained stretched film and bonding the cut piece to a polarizer is used, utilization efficiency of the film is deteriorated and productivity is deteriorated, wherefore improvement has been necessary.

Contrary to this, various methods for producing a long phase difference film have been proposed in which a film is stretched in an oblique direction at a desired angle and a slow axis can be freely controlled in a direction which is neither at 0° nor at 90° with respect to a width direction of the film (see, for example, patent literatures 1 to 4). In these methods, while a resin film is delivered in a direction different from a film winding direction after stretching and conveyed with opposite end parts of the resin film gripped by pairs of gripping tools, one and the other gripping tools are moved different distances to obliquely stretch the resin film when a conveying direction is changed, thereby producing a long stretched film having a slow axis at a desired angle of exceeding 0° and below 90° with respect to a width direction of the resin film. By using such a stretched film in which the slow axis is inclined with respect to the width direction, a circular polarizing plate can be produced by bonding a long polarizing film and the stretched film in a roll-to-roll manner instead of conventional bonding by the batch method. Thus, productivity is dramatically improved and a yield can also be drastically improved.

Further, since the circular polarizing plate can be formed by bonding in a roll-to-roll manner, a utilization area of the long stretched film can be increased and production cost of the circular polarizing plate can be drastically reduced also in the case of use for large-size displays.

When an image in black display on an organic EL display was viewed in mounting a circular polarizing plate formed using a long stretched film produced by an oblique stretching device as described above in the organic EL display, a phenomenon of so-called "color unevenness" in which black was tinged with red or blue and the tinge differs depending on positions on the display was found.

Further, the above phenomenon was not observed in 3D liquid crystal image display devices mounted with the circular polarizing plate and found to be notably observed in organic EL displays mounted with the circular polarizing plate.

As a result of studying these problems, it was found out that, in self-luminous display devices in which light sources corresponding to each color are respectively turned on such as organic EL displays unlike liquid crystal image display devices, there were few members such as color filters which caused a contrast reduction and contrast was very high, whereas a slight variation of an optical property was notably observed as color unevenness and recognized as a problem.

As a result of further studying such problems, it was found out that the long stretched film produced by the conventional oblique stretching device described above had a slight variation of an orientation angle over a longitudinal direction of a product and such a slight variation of the orientation angle was observed as color unevenness.

CITATION LIST

Patent Literature

Patent literature 1: Japanese Patent Application No. 2008-80674
Patent literature 2: Japanese Patent Application No. 2009-78474

Patent literature 3: Japanese Patent Application No. 2010-173261

Patent literature 4: Japanese Patent Application No. 2010-201659

SUMMARY OF INVENTION

The present invention was developed in view of the above conventional problems and an object thereof is to provide a method for producing a long stretched film which method can suppress a variation of an orientation angle in a width direction in the long stretched film stretched in an oblique direction and suppress the occurrence of color unevenness even in the case of use in a circular polarizing plate used for an image display device having very high contrast such as an organic EL display.

As a result of scrutinizing the cause of a slight variation of an orientation angle as the cause of color unevenness as described above, it was found out that the slight variation was caused by that a pair of gripping tools gripping the opposite ends of the long film during oblique stretching are paired with different gripping tools to start gripping to perform an oblique stretching step at the next grip start points after finishing a series of gripping steps from the start to the end of the grip.

In a stretching step, a plurality of gripping tools provided side by side in a conveying direction grip the opposite ends of the long film and a distance between the paired gripping tools is changed while the gripping tools are moved, whereby the long film is stretched. Such gripping tools are desirably produced with maximally high accuracy and each gripping tool has the same properties, but so-called peculiarity occurs due to a difference in working accuracy, a degree of wear, increase and decrease of lubricant and the like. However, in the case of conventional lateral stretching, pairs of gripping tools gripping opposite sides of a film are constantly the same combinations and, since the film is laterally stretched, no large change is found in the obtained film and an orientation angle is hardly affected even when there is a change in the properties of such gripping tools.

On the other hand, in an oblique stretching method in which a delivering direction and a winding direction of a long film are different, i.e. a stretching method in which traveling distances of the gripping tools are made different on opposite ends, thereby moving one gripping tool ahead of the other to obliquely stretch a long film as in the present invention, combinations of the gripping tool pairs at the grip start points inevitably constantly differ in each lap of the gripping tools since times during which the opposite ends of the long film are gripped are different. Thus, stretching conditions vary when performance changes of the gripping tools as described above occur. Further, it was revealed that a slight change of the stretching condition caused a variation of the orientation angle and color unevenness became apparent in the case of use as a circular polarizing plate in an organic EL display. Specifically, such a problem either does not occur or is of an unrecognizable level in the case of normal lateral stretching, but has become apparent by producing a long stretched film by oblique stretching and using such a film in a display device having very high contrast.

Further, it was found that the problem of color unevenness caused by this variation of the orientation angle in the width direction notably occurred in the case of operating the stretching device at a high speed and in the case of thinning the obtained long stretched film.

A method for producing a long stretched film according to one aspect of the present invention includes at least a step of forming a long film made of thermoplastic resin, an oblique stretching step of delivering the long film in a specific direction different from a winding direction of a long stretched film after stretching and obliquely stretching the long film in a direction of an angle exceeding 0° and below 90° with respect to a width direction while gripping and conveying opposite end parts of the long film by a plurality of gripping tools of an oblique stretching device and a winding step of winding the long stretched film after the oblique stretching step. The oblique stretching device includes gripping tool travel support tools at opposite sides of the traveling long film. Each of the gripping tool travel support tools at the opposite sides includes a plurality of gripping tools. The same number of the gripping tools are provided at the opposite sides. A combination of the gripping tools forming a gripping tool pair is constantly the same at grip start points where the long film is gripped by the gripping tools.

An object, features and advantages of the present invention become more apparent from the following detailed description along with the accompanying drawings.

DESCRIPTION OF EMBODIMENTS

Figure 1:
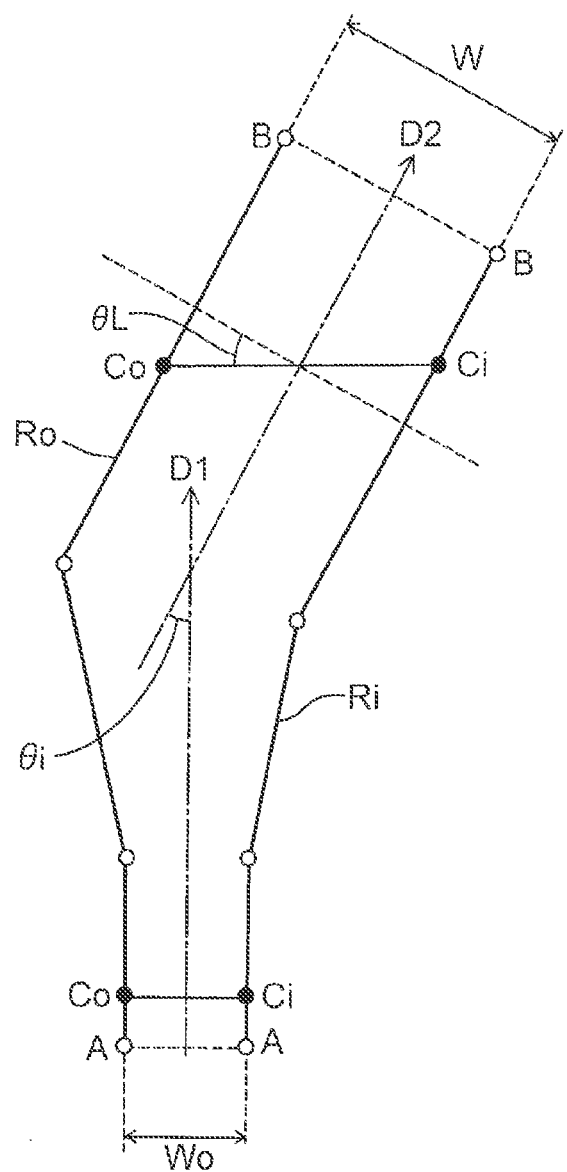
FIG. 1 is a schematic diagram showing oblique stretching used in a method for producing a long stretched film according to one embodiment of the present invention.

Hereinafter, an embodiment of the present invention is described in detail, but the present invention is not limited to this.

As a result of a study to achieve the above object, the present inventors found out that the above object could be achieved by adjusting gripping tools constituting gripping tool pairs for gripping a long film from opposite sides so that the gripping tools constantly form the same combinations in an oblique stretching device. The prevent inventors further studied to complete the present invention based on this knowledge.

Specifically, in the embodiment of the present invention, a method for producing a long stretched film according to one aspect of the present invention includes at least a step of forming a long film made of thermoplastic resin, an oblique stretching step of delivering the long film in a specific direction different from a winding direction of a long stretched film after stretching and obliquely stretching the long film in a direction of an angle exceeding 0° and below 90° with respect to a width direction while gripping and conveying opposite end parts of the long film by a plurality of gripping tools of an oblique stretching device and a winding step of winding the long stretched film after the oblique stretching step. The oblique stretching device includes gripping tool travel support tools at opposite sides of the traveling long film. Each of the gripping tool travel support tools at the opposite sides includes a plurality of gripping tools. The same number of the gripping tools are provided at the opposite sides. A combination of the gripping tools forming a gripping tool pair is constantly the same at grip start points where the long film is gripped by the gripping tools.

Since the present invention is characterized by the oblique stretching step out of the above steps, the oblique stretching step is described in particular detail.

Here, being long means having a length of at least about five times, preferably a length of ten or more times the width of the film. Specifically, the film can have such a length as to be stored or transported by being wound into a roll (film roll).

The present invention is specifically described below with reference to the drawings as appropriate.

<Method for Producing Long Stretched Film>

(Oblique Stretching Step)

The oblique stretching step is a step of stretching a produced long film in a direction oblique to a width direction. In a method for producing a long film, a film of a desired arbitrary length can be formed by continuously producing the film. Note that, in the method for producing a long stretched film, the long film may be wound on a winding core to form a rolled body (also referred to as a rolled web) after being formed and, then, may be supplied for the oblique stretching step or the formed film may be successively supplied to the oblique stretching step after the film forming step without being wound. It is preferable to successively perform the film forming step and the oblique stretching step since film formation conditions can be changed by feeding back the results of a film thickness and optical values after stretching and a desired long stretched film can be obtained.

In the long stretched film producing method of this embodiment, the long stretched film is produced which has a slow axis at an angle exceeding 0° and below 90° with respect to a width direction of the film. Here, the angle with respect to the width direction of the film is an angle in the plane of the film. Since the slow axis in the plane of the film normally appears in a stretching direction or a direction perpendicular to the stretching direction, the long stretched film having such a slow angle can be produced by performing stretching at the angle exceeding 0° and below 90° with respect to an extending direction of the film.

An angle between the width direction of the long stretched film and the slow axis, i.e. an orientation angle can be arbitrarily set at a desired angle in a range exceeding 0° and below 90°.

(Stretching by Oblique Stretching Device)

To orient the long film to be stretched in this embodiment in an oblique direction, the oblique stretching device is used. The oblique stretching device used in this embodiment is preferably a film stretching device capable of freely setting the orientation angle of the film, orienting an orientation axis of the film laterally uniformly in the film width direction with high accuracy and controlling a film thickness and retardation with high accuracy by variously changing route patterns of gripping tool travel support tools.

FIG. 1 is a diagram showing oblique stretching used in the long stretched film producing method of this embodiment. This is only an example and the present invention is not limited to this.

A delivering direction D1 of the long film is different from a winding direction D2 of the long stretched film after stretching, thereby forming a delivery angle θi. The delivery angle θi can be arbitrarily set at a desired angle in the range exceeding 0° and below 90°.

Opposite ends of the long film are gripped by left and right gripping tools (gripping tool pair) at the entrance of the oblique stretching device (grip start points where the gripping tools grip the long film, a straight line connecting the grip start points is denoted by A) and the long film travels as the gripping tools travel.

The gripping tool pair is composed of the left and right gripping tools Ci, Co facing in a direction substantially perpendicular to a traveling direction (delivering direction D1) of the long film at the entrance of the oblique stretching device. The left and right gripping tools Ci, Co respectively travel along bilaterally asymmetric routes and the gripped long stretched film is released at a position where stretching is finished (grip release points where the gripping tools release the grip, a straight line connecting the grip release points is denoted by B).

At this time, as the left and right gripping tools facing each other at the entrance (position A in FIG. 1) of the oblique stretching device respectively travel along an inner gripping tool travel support tool Ri and an outer gripping tool travel support tool Ro, which are bilaterally asymmetric, the gripping tool Ci traveling along the inner gripping tool travel support tool Ri is in a positional relationship to be ahead of the gripping tool Co traveling along the outer gripping tool travel support tool Ro.

Specifically, in a state where the gripping tools Ci, Co facing each other in the direction substantially perpendicular to the delivering direction D1 of the long film at the entrance of the oblique stretching device are at positions B, the straight line connecting the gripping tools Ci, Co is inclined by an angle θL with respect to the direction substantially perpendicular to the winding direction D2 of the long stretched film.

By the above operation, the long film is obliquely stretched in a direction of θL. Here, substantially perpendicular means within a range of 90±1°.

The producing method of the present invention is carried out using a stretching device capable of oblique stretching. This stretching device is a device for heating the long film at an arbitrary temperature at which the long film can be stretched and obliquely stretching the long film. This stretching device includes a heating zone, a plurality of gripping tools which travel while gripping the opposite sides of the long film and are paired on the both sides, and gripping tool travel support tools for supporting the travel of the gripping tools.

The opposite ends of the long film successively supplied to an entrance part (grip start points) of the stretching device are gripped by the gripping tools, and the long film is introduced into the heating zone and released from the gripping tools at an exit part (grip release points) of the stretching device. The long stretched film released from the gripping tools is wound on a winding core. The gripping tool travel support tools each including the gripping tools have an endless continuous path and the gripping tools having released the long stretched film at the exit part of the stretching device are successively returned to the grip start points by the gripping tool travel support tools.

The gripping tool travel support tool may be, for example, such that an endless chain whose path is restricted by a guide rail or a gear includes gripping tools or such that an endless guide rail includes gripping tools. Specifically, in the present invention, the gripping tool travel support tool may be an open-ended guide rail including an endless chain, an endless guide rail including an endless chain or an endless guide rail including no chain. The gripping tools travel along a route of the gripping tool travel support tool if the gripping tool travel support tool includes no chain while traveling along the route of the gripping tool travel support tool via a chain if the chain is included. Although a case where the gripping tools travel along the route of the gripping tool travel support tool is described as an example in the present invention, the gripping tools may travel along the route of gripping tool travel support tool via the chain provided with the gripping tools in either case.

Note that the gripping tool travel support tools of the stretching device are shaped to be bilaterally asymmetric and route patterns can be manually or automatically adjusted according to the orientation angle to be given to the long stretched film to be produced, a stretch ratio and the like.

In the stretching device of this embodiment, preferably, the route of each gripping tool travel support tool can be freely set and the pattern of the route of the gripping tool travel support tool can be arbitrarily changed.

In the embodiment of the present invention, a traveling speed of the gripping tool of the stretching device can be appropriately selected. Above all, 1 to 150 m/min is preferable. If the traveling speed of the gripping tool of the stretching device is faster than 150 m/min, a local stress applied to an end part of the film increases at a position where the long film is obliquely conveyed, whereby the end part of the film is wrinkled or shifted and an effective width obtained as a good product out of the entire width of the film obtained after the end of stretching tends to be narrow.

In the present invention, a difference in the traveling speed of the gripping tool pairs at least gripping the film is normally 1% or less, preferably 0.5% or less and more preferably 0.1% or less of the traveling speed. The traveling speeds are substantially equal. This is because a speed difference of the left and right gripping tools constituting the gripping tool pairs is required to be substantially zero since the film is wrinkled or shifted at the end of the stretching step if there is a difference in the traveling speed of the long stretched film on the left and right sides at the end of the stretching step. In a general stretching device or the like, speed unevenness occurs in the order of seconds or less according to the pitch of teeth of a sprocket (gear) for driving a chain, a frequency of a drive motor and the like. This speed unevenness is often several %, but these do not fall under the speed difference described in this embodiment.

Figure 2:
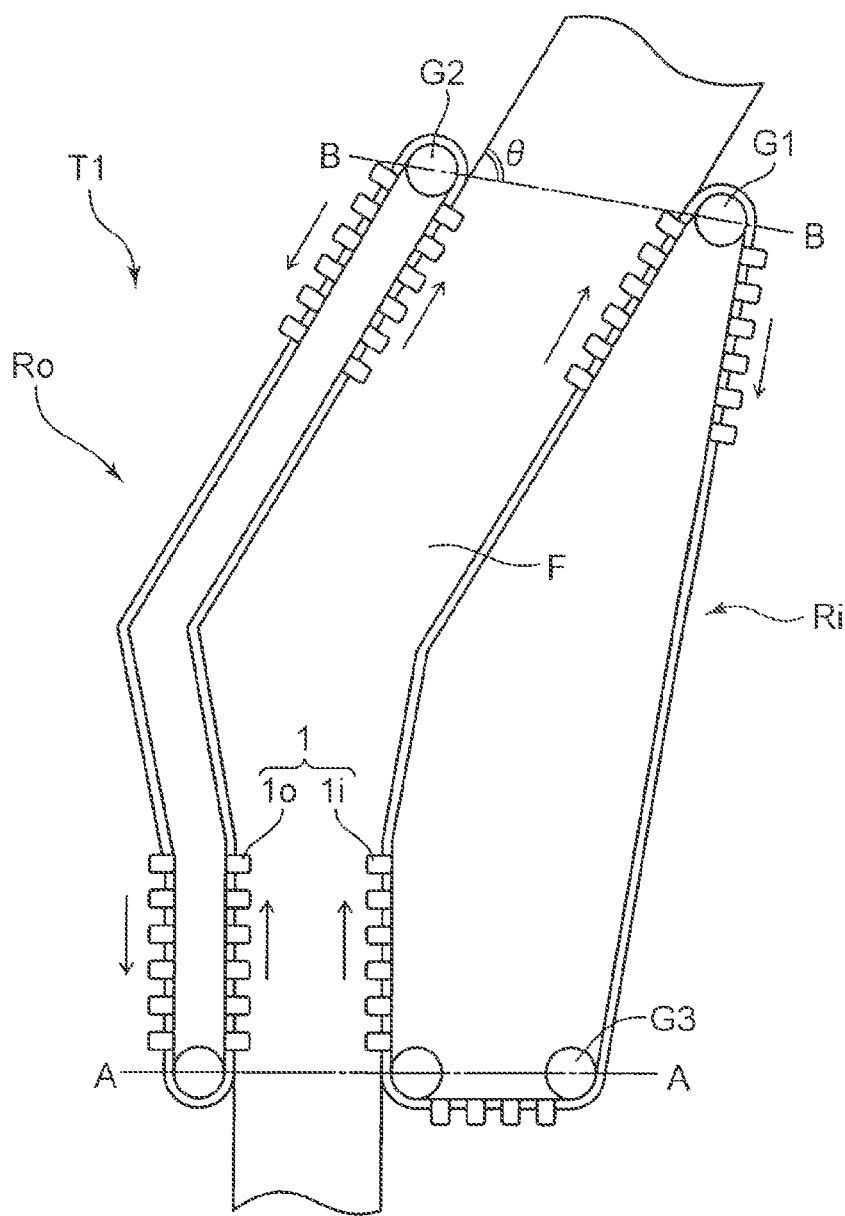
FIG. 2 is a schematic diagram of a stretching device according to the embodiment of the present invention.

The lengths (entire lengths) of the gripping tool travel support tools are not particularly limited. As shown in FIG. 2, if the gripping tool travel support tools have the same length, the same number of gripping tools traveling at an equal speed can constantly form the gripping tool pairs by being paired with the same gripping tools paired at first. As a result, a variation of the orientation angle can be suppressed by setting proper combinations according to properties of the gripping tool pairs. Even if a property changes in some gripping tools, such a change can be easily detected, the gripping tools can be properly adjusted to suppress a variation of the orientation angle and, as a result, the occurrence of color unevenness can be suppressed. FIG. 2 is a schematic diagram of a stretching device T1 in which the route of the inner gripping tool travel support tool Ri and that of the outer gripping tool travel support tool Ro have the same length.

The step of stretching the long stretched film in the present invention is described more specifically with reference to FIG. 2. As shown in FIG. 2, the gripping tools (gripping tools 1i, 1o) are adjusted to grip widthwise end parts of the long film at the grip start points on the straight line A. The gripping tool 1i that travels along the route of the inner gripping tool travel support tool Ri and the gripping tool 1o that travels along the route of the outer gripping tool travel support tool Ro are aligned on the straight line A.

Each of the gripping tools of the gripping tool travel support tools on the both sides has an endless continuous path and travels along the gripping tool travel support tool. The gripping tools grip the long film supplied at the grip start points and release the long stretched film F at the grip release points on the straight line B after stretching. Each gripping tool having released the long stretched film F continues to travel along the gripping tool travel support tool, reaches the grip start point again and grips the long film continuously supplied. In this way, the gripping tools circle along the gripping tool travel support tools and repeatedly grip, stretch and release the supplied long film. These movements are successively performed by the gripping tool pair formed by one gripping tool traveling along the route of the inner gripping tool travel support tool Ri and one gripping tool traveling along the route of the outer gripping tool travel support tool Ro. In the present invention, the combination of the gripping tools forming the gripping tool pair is constantly the same.

Note that a separating distance between the gripping tools forming the gripping tool pair is equivalent to the width of the supplied long film. The long film is conveyed together with the traveling gripping tools and passes through unillustrated preheating zone, stretching zone, thermal fixing zone and cooling zone. The gripping tool traveling along the route of the inner gripping tool travel support tool Ri reaches the grip release point and releases the long stretched film earlier than the gripping tool traveling along the route of the outer gripping tool travel support tool Ro. Note that when the gripping tool traveling along the route of the inner gripping tool travel support tool Ri reaches the grip release point, the other gripping tool paired with the former gripping tool at the grip start point has not reached the grip release point yet and is traveling along the route of the outer gripping tool travel support tool Ro.

In FIG. 2, the straight line B connecting the grip release points of the gripping tools 1i traveling along the route of the inner gripping tool travel support tool Ri and that of the gripping tools 1o traveling along the route of the outer gripping tool travel support tool Ro is not parallel to the width direction of the traveling long stretched film F. Further, the length of the route of the inner gripping tool travel support tool Ri and that of the route of the outer gripping tool travel support tool Ro are equal. As shown in FIG. 2, a turning gear G1 provided near the grip release point of the inner gripping tool travel support tool is arranged downstream of a turning gear G2 provided near the grip release point of the outer gripping tool travel support tool in the traveling direction of the long stretched film F. As a result, an angle θ between the straight line B and the traveling direction of the long stretched film F is larger than 0° and below 90°. In this case, a stress applied to the long stretched film F by the gripping tool 1i traveling along the route of the inner gripping tool travel support tool Ri when the long stretched film F is released and a stress applied to the long stretched film F by the gripping tool 1o traveling along the route of the outer gripping tool travel support tool Ro when the long stretched film F is released do not cancel out each other. As a result, there is a possibility of thickness unevenness in the obtained long stretched film F. Thus, the straight line B connecting the grip release points is preferably parallel to the width direction of the long stretched film F. Note that, in the stretching device T1 of FIG. 2, an adjusting gear G3 is provided in the inner gripping tool travel support tool Ri to make the length of the route of the inner gripping tool travel support tool Ri equal to that of the route of the outer gripping tool travel support tool Ro. The adjusting gear G3 is a gear for stretching the inner gripping tool travel support tool Ri toward an outer side in a circumferential direction.

Figure 3:
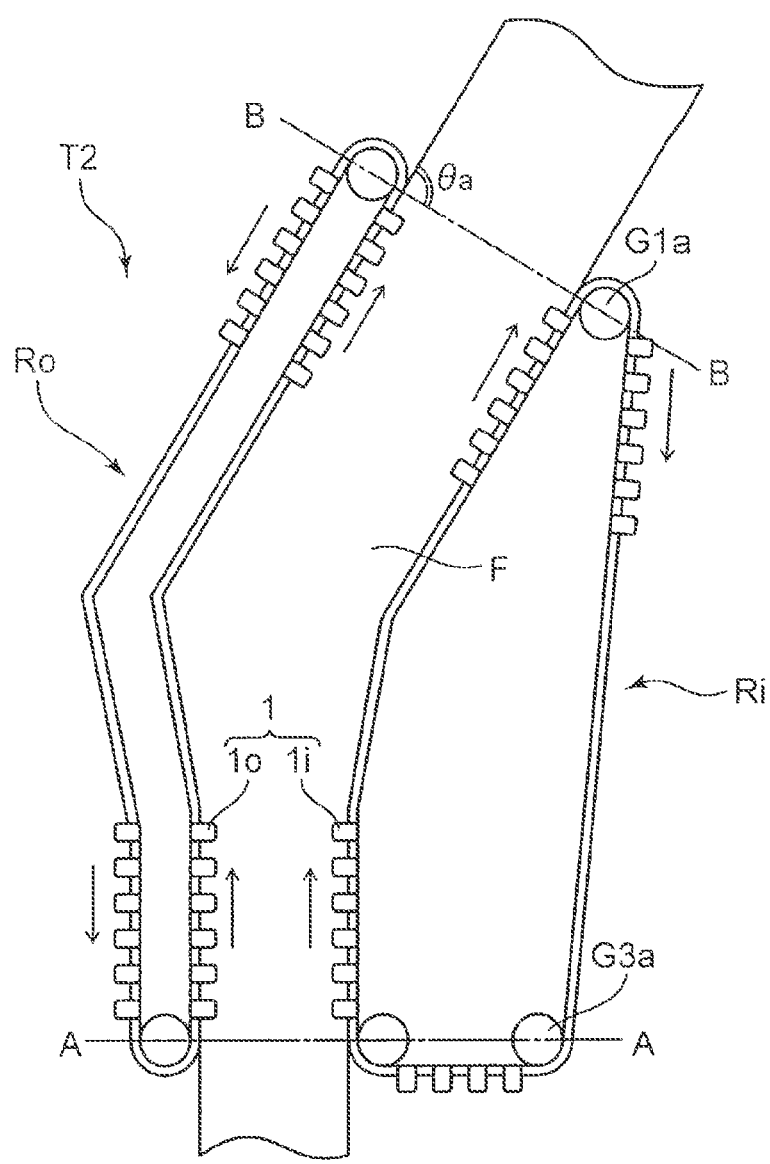
FIG. 3 is a schematic diagram of a stretching device according to the embodiment of the present invention.

FIG. 3 is a schematic diagram of a stretching device T2 formed such that the length of a route of an inner gripping tool travel support tool Ri and that of a route of an outer gripping tool travel support tool Ro are equal and a straight line connecting grip release points is parallel to a width direction of a long stretched film F. As shown in FIG. 3, an angle θa between the straight line connecting the grip release points and a traveling direction of the long stretched film F is 90°. A turning gear G1a provided near the grip release point of the inner gripping tool travel support tool is arranged upstream of the turning gear G1 of FIG. 2 in a traveling direction of the long stretched film F. As a result, the straight line B is parallel to the width direction of the long stretched film F. In this case, there is a possibility of deflecting the inner gripping tool travel support tool. Thus, as shown in FIG. 3, an adjusting gear G3a is provided in the inner gripping tool travel support tool. The adjusting gear G3a is a gear for stretching the inner gripping tool travel support tool toward an outer side in a circumferential direction to eliminate the deflection of the inner gripping tool travel support tool caused by changing the position of the turning gear G1a.

By producing the long stretched film F using the stretching device T2, stresses applied to the long stretched film F are canceled out at opposite widthwise end parts of the long stretched film particularly when the gripping tools release the long stretched film F at the grip release points. Thus, thickness unevenness of the obtained long stretched film F is reduced.

Figure 4:
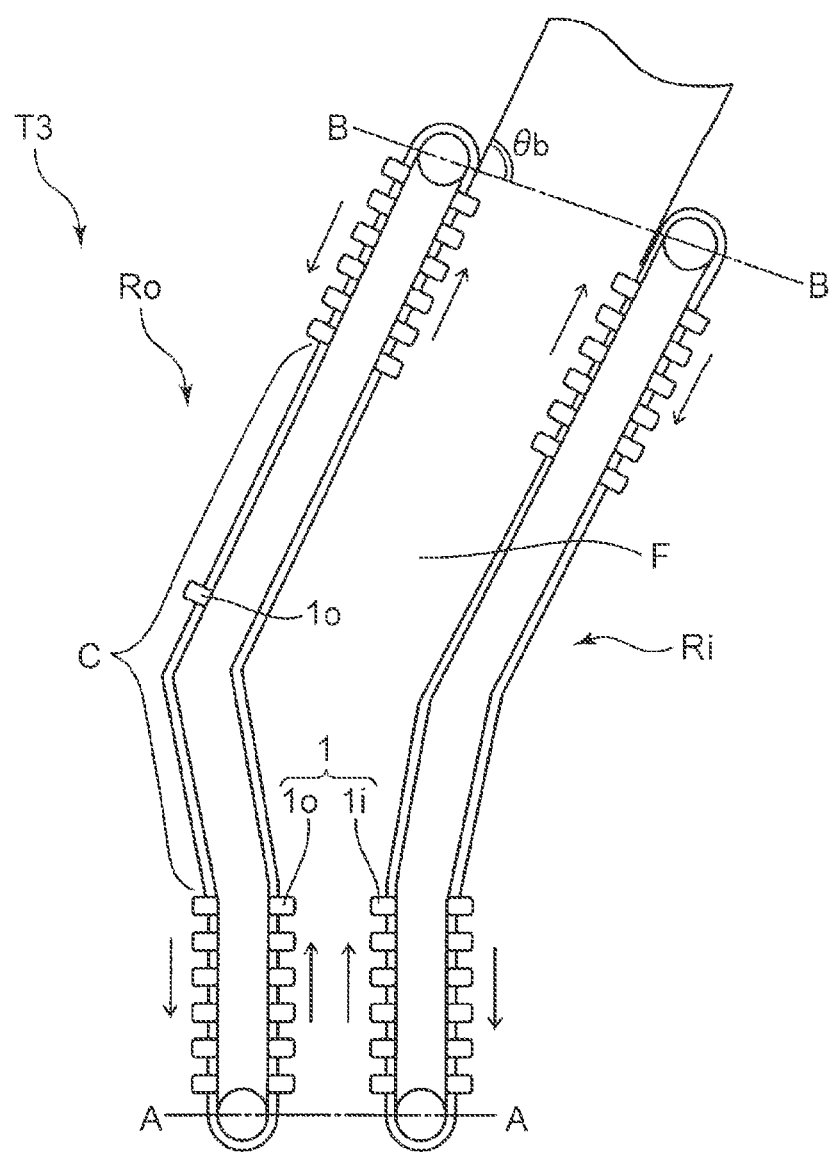
FIG. 4 is a schematic diagram of a stretching device according to the embodiment of the present invention.

On the other hand, if it is difficult to make the entire lengths of the gripping tool travel support tools equal in the configuration of the stretching device, a speed adjusting mechanism (not shown) for increasing and decreasing the traveling speeds of the gripping tools may be provided in one or both of the gripping tool travel support tools as in a stretching device T3 shown in FIG. 4. In FIG. 4, a case is illustrated where the speed adjusting mechanism for increasing the traveling speed of gripping tools traveling along a route of an outer gripping tool travel support tool Ro is provided. The speed adjusting mechanism is a mechanism for adjusting the traveling speed of the gripping tool 1o having released the long film F at the grip release point until the gripping tool 1o returns to the grip start point again. A method for adjusting the traveling speed of the gripping tool is not particularly limited. For example, the traveling speed of the gripping tool may be increased or decreased such as by inclining the gripping tool travel support tool, by blowing air, by generating a magnetic field or by dividing the gripping tool travel support tool into a plurality of sections having different friction coefficients. The traveling speeds of the gripping tools can be adjusted by decreasing the speed of the gripping tools traveling along the route of the gripping tool travel support tool having a shorter entire length, increasing the speed of the gripping tools traveling along the route of the gripping tool travel support tool having a longer entire length or by combining the both adjustments. In FIG. 4, C denotes a section in which the traveling speed of the gripping tool is adjusted by the speed adjusting mechanism. In this embodiment, this section is a section in which the gripping tool having released the grip at the grip release point travels and a section until the grip start point is reached. As shown in FIG. 4, the gripping tools to accelerated by the speed adjusting mechanism travel in the section C. By adjusting the traveling speeds of the gripping tools in this way, the entire lengths of the routes of the gripping tool travel support tools need not be made equal and a drastic design change of the device is not necessary. Further, it is possible to calculate how much the speed of the gripping tool needs to be adjusted in advance when the patterns of the routes of the gripping tool travel support tools and a stretching angle are adjusted. As a result, in the producing method of the present invention, the traveling speeds of the gripping tools can be so immediately adjusted that the same gripping tool pairs are constantly aligned at the grip start points in the case of changing the stretching angle or the like, which provides good convenience. Note that although a case where an angle θb between a straight line connecting the grip release points and the traveling direction of the long stretched film F is 90° is shown in FIG. 4, the angle θb may be larger than 0° and below 90° as in the stretching direction T1 shown in FIG. 2.

In the oblique stretching device used in this embodiment, the gripping tool travel support tools for restricting the path of the gripping tools are often required to have a large bending rate particularly at positions where the conveying direction of the long film is inclined. For the purpose of avoiding the interference of the gripping tools or a local stress concentration caused by steep bending, the paths for the gripping tools are desirably arcuate at bent parts.

In this embodiment, the long film travels as the gripping tools travel while the opposite ends thereof are successively gripped by the left and right gripping tools (gripping tool pair) at the entrance of the oblique stretching device (position of the straight line A of FIG. 1). At the entrance of the oblique stretching device, the pair of gripping tools facing each other in the direction substantially perpendicular to the long film traveling direction D1 travel along the bilaterally asymmetric routes and pass through a heating zone including the preheating zone, the stretching zone and the thermal fixing zone.

The preheating zone indicates a section in which the gripping tools gripping the opposite ends travel while keeping a constant spacing therebetween at an entrance part of the heating zone.

The stretching zone indicates a section in which the spacing between the gripping tools gripping the opposite ends starts increasing and reaches a predetermined spacing. Although the long film can be stretched in an oblique direction in the stretching zone in the present invention, it may be obliquely stretched after being laterally stretched in the stretching zone or may be stretched in the width direction after being obliquely stretched without being limited to stretching in the oblique direction.

The thermal fixing zone indicates a section in which the gripping tools on the opposite ends travel while being kept in parallel with each other for a period during which the spacing between the gripping tools is constant again after the stretching zone. After passing through the thermal fixing zone, the long film may pass through a section in which temperature is set at a glass transition temperature Tg° C. of thermoplastic resin constituting the long film or lower (cooling zone). At this time, such route patterns as to narrow the spacing between the gripping tools facing each other in advance may be adopted in consideration of the shrinkage of the long stretched film caused by cooling.

In the present invention, lateral stretching and longitudinal stretching may be performed if necessary in a step before or after the long film is introduced into the oblique stretching device for the purpose of adjusting mechanical properties and optical properties of the film.

Temperature in each zone is preferably set based on the glass transition temperature Tg of the thermoplastic resin as follows. The temperature of the preheating zone is Tg to Tg+30° C. The temperature of the stretching zone is Tg to Tg+30° C. The temperature of the cooling zone is Tg−30° C. to Tg.

Note that a temperature difference may be provided in the width direction in the stretching zone to control thickness unevenness in the width direction. To provide a temperature difference in the width direction in the stretching zone, it is possible to use a known method such as a method for adjustment to make an opening of a nozzle for blowing hot air into a thermostatic chamber different in the width direction or a method for heating control by arranging heaters in the width direction. The lengths of the preheating zone, the stretching zone and the thermal fixing zone can be appropriately selected. The length of the preheating zone is normally 100 to 150% of the length of the stretching zone, and that of the thermal fixing zone is normally 50 to 100% of the length of the stretching zone. Further, the cooling zone may be provided after the thermal fixing zone.

A stretch ratio R (W/W0) in the stretching step is preferably 1.3 to 3.0 and more preferably 1.5 to 2.8. It is preferable that the stretch ratio is in this range since thickness unevenness in the width direction is reduced. In the stretching zone, thickness unevenness in the width direction can be further improved to a better level if stretching temperature is varied in the width direction. Note that W0 denotes the width of the long film before stretching and W denotes the width of the long stretched film after stretching.

Next, other steps that can be adopted in the present invention are described. Note that it is sufficient to provide the oblique stretching step described above and other steps are not particularly limited. Thus, the other steps described below are illustrative and design changes can be made as appropriate.

(Film Forming Step of Long Film)

The film forming step is a step of forming the long film made of thermoplastic resin.

The long film to be formed in this embodiment is not particularly limited and may be any long film made of thermoplastic resin.

For example, in the case of using the long stretched film after stretching for optical application, a film made of resin having a property of being transparent at a desired wavelength is preferable. Examples of such resin may include polycarbonate-based resin, polyether sulfone-based resin, polyethylene terephthalate-based resin, polyimide-based resin, polymethyl methacrylate-based resin, polysulfone-based resin, polyarylate-based resin, polyethylene-based resin, polyvinyl chloride-based resin, olefin polymer-based resin having an alicyclic structure and cellulose ester-based resin. Among these, polycarbonate-based resin, olefin polymer-based resin having an alicyclic structure and cellulose ester-based resin are preferable in terms of transparency and mechanism strength. Among them, olefin polymer-based resin having an alicyclic structure and cellulose ester-based resin that facilitate an adjustment of a phase difference in the case of use as an optical film are further preferable. Among them, olefin polymer-based resin having an alicyclic structure is particularly preferable since end parts of the film are unlikely to be wrinkled or shifted due to a low stretching stress even when the film is obliquely stretched during high-speed conveyance.

<Alicyclic Olefin Polymer-Based Resin>

A cyclic olefin random multi-component copolymer disclosed in Japanese Unexamined Patent Publication No. H05-310845, a hydrogen-added polymer disclosed in Japanese Unexamined Patent Publication No. H05-97978, a thermoplastic dicyclopentadiene-based ring-opening polymer and a hydrogenated product thereof disclosed in Japanese Unexamined Patent Publication No. H11-124429 can be used as alicyclic olefin polymer based resin.

The olefin polymer-based resin having an alicyclic structure is more specifically described. The olefin polymer-based resin having an alicyclic structure is a polymer having an alicyclic structure such as a saturated alicyclic hydrocarbon (cycloalkane) structure or an unsaturated alicyclic hydrocarbon (cycloalkene) structure. There is no particular limit to the number of carbon atoms constituting an alicyclic structure, but when the number of carbon atoms is normally in a range of 4 to 30, preferably in a range of 5 to 20 and more preferably in a range of 5 to 15, mechanical strength, heat resistance and moldability of the long film are highly balanced, which is preferable.

A ratio of repeating units including an alicyclic structure in an alicyclic olefin polymer may be appropriately selected, but preferably 55 weight % or more, further preferably 70 weight % or more and particularly preferably 90 weight % or more. It is preferable that the ratio of the repeating units including the alicyclic structure in the alicyclic olefin polymer is in this range since transparency and heat resistance of an optical material such as a phase difference film obtained from the long stretched film of the present invention are improved.

Examples of olefin polymer-based resins having an alicyclic structure may include norbornene-based resin, single cyclic olefin-based resin, cyclic conjugated diene-based resin, vinyl cyclic hydrocarbon-based resin and hydrogenated products of these. Among these, norbornene-based resin can be suitably used since transparency and moldability are good.

Examples of norbornene-based resin may include ring-opening polymers of monomers having a norbornene structure, ring-opening copolymers of monomers having a norbornene structure and other monomers, hydrogenated products thereof, addition polymers of monomers having a norbornene structure, and addition copolymers of monomers having a norbornene structure and other monomers and hydrogenated products thereof. Among these, hydrogenated products of ring-opening (co)polymers of monomers having a norbornene structure can be particularly suitably used in terms of transparency, moldability, heat resistance, low hygroscopicity, dimensional stability and light weight.

Examples of monomers having a norbornene structure may include bicyclo[2.2.1]hept-2-ene (trivial name: norbornene), tricyclo[4.3.0.12,5]deca-3,7-dien (trivial name: dicyclopentadiene), 8-benzotricyclo[4.3.0.12,5]deca-3-ene (trivial name: methanotetrahydrofluorene), tetracyclo[4.4.0.12,5.17,10]dodeca-3-ene (trivial name: tetracyclododecene) and derivatives of compounds of these (e.g. those including a substituent in a ring). Here, examples of the substituent may include an alkyl group, an alkylene group and a polar group. A plurality of the same or different ones of these substituents may be bonded to a ring. Monomers having a norbornene structure can be singly used or two or more kinds thereof may be used in combination.

Kinds of the polar group may include a heteroatom and an atom group including a heteroatom. Examples of the heteroatom may include an oxygen atom, a nitrogen atom, a sulfur atom, a silicon atom and a halogen atom. Specific examples of the polar group may include a carboxyl group, a carbonyloxycarbonyl group, an epoxy group, a hydroxy group, an oxy group, an ester group, a silanol group, a silyl group, an amino group, a nitrile group and a sulfo group.

Examples of other monomers capable of ring-opening copolymerization with monomers having a norbornene structure may include monocyclic olefins such as cyclohexane, cycloheptene and cyclooctene and derivatives thereof; and cyclic conjugated dienes such as cyclohexadiene and cycloheptadiene and derivatives thereof.

Ring-opening polymers of monomers having a norbornene structure and ring-opening copolymers of monomers having a norbornene structure and other monomers capable of copolymerization with the former monomers can be obtained by (co)polymerizing monomers under the presence of a known ring-opening polymerization catalyst.

Examples of other monomers capable of addition copolymerization with monomers having a norbornene structure may include α-olefins having a carbon number of 2 to 20 such as ethylene, propylene and 1-butene and derivatives thereof; cycloolefines such as cyclobutene, cyclopentene and cyclohexane and derivatives thereof; and non-conjugated dienes such as 1,4-hexadiene, 4-methyl-1,4-hexadiene and 5-methyl-1,4-hexadiene. These monomers can be singly used or two or more kinds thereof may be used in combination. Among these, α-olefins are preferable and ethylene is more preferable.

Addition polymers of monomers having a norbornene structure and addition copolymers of monomers having a norbornene structure and other monomers capable of copolymerization with the former monomers can be obtained by polymerizing monomers under the presence of a known addition polymerization catalyst.

Hydrogenated products of ring-opening polymers of monomers having a norbornene structure, hydrogenated products of ring-opening copolymers of monomers having a norbornene structure and other monomers capable of ring-opening copolymerization with the former monomers, hydrogenated products of addition polymers of monomers having a norbornene structure and hydrogenated products of addition copolymers of monomers having a norbornene structure and other monomers capable of copolymerization with the former monomers can be obtained by adding a known hydrogenation catalyst containing a transition metal such as nickel or palladium to solutions of these polymers and hydrogenating preferably 90% or more of carbon-carbon unsaturated bonds.

Among norbornene-based resins, preferable ones are such that X: bicyclo[3.3.0]octane-2,4-diyl-ethylene structure and Y: tricyclo[4.3.0.12,5]decane-7,9-diyl-ethylene structure are included as repeating units, the content of these repeating units is 90 weight % or more of all the repeating units of the norbornene-based resin, and the content of X and the content of Y are 100:0 to 40:60 in a weight ratio of X:Y. By using such resin, an optical material obtained from the long stretched film of the present invention has no dimensional change in the long term and can be excellent in optical property stability.

A molecular weight used for norbornene-based resin is appropriately selected according to intended use, but is normally 10,000 to 100,000, preferably 15,000 to 80,000 and more preferably 20,000 to 50,000 in weight average molecular weight (Mw) in terms of polyisoprene (in terms of polystyrene if a solvent is toluene) measured by gel permeation chromatography using cyclohexane as a solvent (toluene if thermoplastic resin is not dissolved). It is preferable that the weight average molecular weight is in such a range since mechanical strength and moldability of the optical material obtained from the long stretched film of the present invention are highly balanced.

A glass transition temperature of the norbornene-based resin may be appropriately selected according to intended use, but preferably 80° C. or higher and more preferably in a range of 100 to 250° C. If the glass transition temperature is in such a range, the optical material obtained from the long stretched film of the present invention can be excellent in durability without being deformed or stressed in use under a high temperature.

A molecular weight distribution (weight average molecular weight (Mw)/number average molecular weight (Mn)) of the norbornene-based resin is not particularly limited, but normally in a range of 1.0 to 10.0, preferably in a range of 1.1 to 4.0 and more preferably in a range of 1.2 to 3.5.

An absolute value of a photoelastic coefficient C of the norbornene-based resin is preferably $10 \times 10^{-12}$ $Pa^{-1}$ or smaller, more preferably $7 \times 10^{-12}$ $Pa^{-1}$ or smaller and particularly preferably $4 \times 10^{-12}$ $Pa^{-1}$ or smaller. The photoelastic coefficient C is a value expressed by $\Delta n / \sigma$ if $\Delta n$ denotes birefringence and $\sigma$ denotes stress. If the photoelastic coefficient of the thermoplastic resin is in such a range, a variation of retardation (Re) in an in-plane direction can be reduced.

The thermoplastic resin used in the present invention may be appropriately mixed with a colorant such as a pigment and a dye or a compounding agent such as a fluorescent brightening agent, a dispersant, a heat stabilizer, a light stabilizer, an ultraviolet absorbing agent, an antistatic, an antioxidant, a lubricant and a solvent.

The content of remaining volatile components in the long stretched film of the norbornene-based resin is not particularly limited, but preferably 0.1 mass weight % or less, more preferably 0.05 mass weight % or less and further preferably 0.02 mass weight % or less. By setting the content of the volatile components in such a range, dimensional stability is improved and changes of Re and Rth described above with time can be reduced. Further, the deterioration of a phase difference film, a polarizing plate or an image display device such as an organic EL display obtained from the long stretched film of the present invention can be suppressed and the display of the image display device such as an organic EL display can be stably and satisfactorily maintained in the long term. The remaining volatile components are a tiny amount of substances having a molecular weight of 200 or less and contained in the long film and examples thereof may include remaining monomers and solvent. The content of the remaining volatile components can be quantified by analyzing the long film by gas chromatography as a total of substances contained in the long film and having a molecular weight of 200 or less.

A saturated water absorption of the long stretched film of the norbornene-based resin is preferably 0.03 mass % or less, further preferably 0.02 mass % or less and particularly preferably 0.01 mass % or less. If the saturated water absorption is in the above range, changes of Re and Rth with time can be reduced. Further, the deterioration of a phase difference film, a polarizing plate or an image display device such as an organic EL display obtained from the long stretched film of the present invention can be suppressed and the display of the image display device such as an organic EL display can be stably and satisfactorily maintained in the long term.

The saturated water absorption is a value expressed as a percentage of an increased mass to a test piece mass before immersion when the test piece of the long film is immersed in water of a given temperature for a given time. Normally, a measurement is made after the test piece is immersed in water of 23° C. for 24 hours. The saturated water absorption of the long stretched film of the present invention can be adjusted to the above value, for example, by reducing the amount of polar groups in the thermoplastic resin, but the thermoplastic resin is desirably resin having no polar group.

Producing methods such as solution film formation methods and melt extrusion methods are preferred as a method for forming the long film using the above preferable norbornene-based resin. An inflation method using a die and the like can be cited as the melt extrusion method, but a method using a T-die is preferable in terms of excellent productivity and thickness precision.

An extrusion molding method using a T-die can produce a long film with good variations of optical properties such as retardation and an orientation angle by a method for keeping molten thermoplastic resin in a stable state when the thermoplastic resin is brought into close contact with a cooling drum as disclosed in Japanese Unexamined Patent Publication No. 2004-233604.

Specific examples of the method may include 1) a method for bringing sheet-like thermoplastic resin extruded from a die into close contact with a cooling drum to take up the sheet-like thermoplastic resin under a pressure of 50 kPa or lower in producing a long film by the melt extrusion method; 2) a method for covering an area from an opening of a die to a cooling drum with which a long film is to be first brought into close contact by a covering member and setting a distance from the covering member to the opening of the die or the cooling drum with which the long film is to be first brought into close contact to 100 mm or shorter in producing the long film by the melt extrusion method; 3) a method for heating an atmosphere within 10 mm from sheet-like thermoplastic resin extruded from an opening of the die to a specific temperature in producing a long film by the melt extrusion method; 4) a method for bringing sheet-like thermoplastic resin extruded from a die to satisfy a relationship into close contact with a cooling drum to take up the sheet-like thermoplastic resin under a pressure of 50 kPa or lower; and 5) a method for blowing air at a speed different from a take-up speed of a cooling drum with which a long film is to be first brought into close contact by 0.2 m/s or less to sheet-like thermoplastic resin extruded from an opening of a die in producing the long film by the melt extrusion method.

This long film may be a single-layer film or a laminated film composed of two or more layers. The laminated film can be obtained by known methods such as a co-extrusion molding method, a co-casting molding method, a film lamination method and a coating method. Among these, the co-extrusion molding method and the co-casting molding method are preferable.

<Cellulose Ester-Based Resins>

Resin containing cellulose acylate satisfying the following expressions (i) and (ii) and a compound expressed by the following general expression (A) can be cited as cellulose ester-based resin.

$$2.0 \leq Z1 \leq 3.0 \quad \text{Expression (i)}$$

$$0.5 \leq X \quad \text{Expression (ii)}$$

(In the expressions (i) and (ii), Z1 denotes a total degree of acyl substitution of cellulose acylate and X denotes the sum of a degree of propionyl substitution and a degree of butyryl substitution of cellulose acylate.)

(Compound of Generation Expression (A))

The generation expression (A) is described in detail below.

[Chemical Formula 1]

GENERATION EXPRESSION (A)

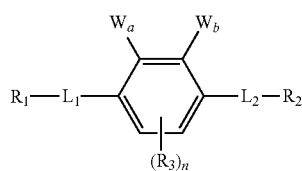

In the generation expression (A), $L_1$, $L_2$ independently denote monovalent or bivalent linking groups.

The following structure can be, for example, cited as $L_1$, $L_2$ (R below denotes a hydrogen atom or substituent).

[Chemical Formula 2]

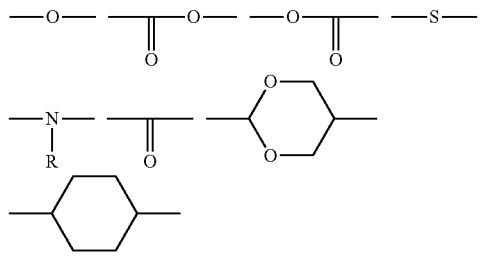

$L_1$, $L_2$ are preferably —O—, —COO— or —OCO—. $R_1$, $R_2$ and $R_3$ independently denote substituents.

Specific examples of the substituents expressed by $R_1$, $R_2$ and $R_3$ may include halogen atoms (fluorine atom, chloride atom, bromine atom, iodine atom, etc.), alkyl groups (methyl group, ethyl group, n-propyl group, isopropyl group, tert-butyl group, n-octyl group, 2-ethylhexyl group, etc.), cycloalkyl groups (cyclohexyl group, cyclopentyl group, 4-n-dodecyl cyclohexyl group, etc.), alkenyl groups (vinyl group, aryl group, etc.), cycloalkenyl groups (2-cyclopentene-1-yl, 2-cyclohexane-1-yl groups, etc.), alkynyl groups (ethynyl group, propagyl group, etc.), aryl groups (phenyl group, p-tryl group, naphthyl group, etc.), hetero ring groups (2-furyl group, 2-thienyl group, 2-pyrimidinyl group, 2-benzothiazolyl group, etc.), cyano groups, hydroxyl groups, nitro groups, carboxyl groups, alkoxy groups (methoxy group, ethoxy group, isopropoxy group, tert-butoxy group, n-octyloxy group, 2-methoxyethoxy group, etc.), aryloxy groups (phenoxy group, 2-methyl phenoxy group, 4-tert-butyl phenoxy group, 3-nitro phenoxy group, 2-tetradecanoyl amino phenoxy group, etc.), acyloxy groups (formyloxy group, acetyloxy group, pivaloyloxy group, stearoyloxy group, benzoyloxy group, p-methoxyphenyl carbonyloxy group, etc.), amino groups (amino group, methyl amino group, dimethyl amino group, anilino group, N-methyl-anilino group, diphenyl amino group, etc.), acyl amino groups (formyl amino group, acetyl amino group, pivaloyl amino group, lauloyl amino group, benzoyl amino group, etc.), alkyl and aryl sulfonyl amino groups (methylsulfonyl amino group, butylsulfonyl amino group, phenylsulfonyl amino group, 2,3,5-trichlorophenyl sulfonyl amino group, p-methyl phenylsulfonyl amino group, etc.), mercapto groups, alkylthio groups (methylthio group, ethylthio group, n-hexadecylthio group, etc.), arylthio groups (phenylthio group, p-chlorophenylthio group, m-methoxyphenylthio group, etc.), sulfamoyl groups (N-ethyl sulfamoyl group, N-(3-dodecyloxy propyl)sulfamoyl group, N,N-dimethylsulfamoyl group, N-acetylsulfamoil group, N-benzoylsulfamoyl group, N—(N' phenylcarbamoyl)sulfamoyl group, etc.), sulfo groups, acyl groups (acetyl group, pivaloylbenzoyl group, etc.) and carbamoyl groups (carbamoyl group, N-methylcarbamoyl group, N,N-dimethylcarbamoyl group, N,N-di-n-octylcarbamoyl group, N-(methylsulfonyl)carbamoyl group, etc.).

$R_1$, $R_2$ are preferably substituted or non-substituted phenyl groups or substituted or non-substituted cyclohexyl groups, more preferably phenyl groups including a substituent or cyclohexyl groups including a substituent, further preferably phenyl groups including a substituent at position 4 or cyclohexyl groups including a substituent at position 4.

$R_3$ is preferably a hydrogen atom, a halogen atom, an alkyl group, an alkenyl group, a aryl group, a hetero ring group, a hydroxyl group, a carboxyl group, an alkoxy group, an aryloxy group, an acyloxy group, a cyano group or an amino group, and further preferably a hydrogen atom, a halogen atom, an alkyl group, a cyano group or alkoxy group.

Wa, Wb denote a hydrogen atom or a substituent.

(I) Wa and Wb may be bonded to each other to form a ring.

(II) At least one of Wa and Wb may have a ring structure, or (III) At least one of Wa and Wb may be an alkenyl group or an alkynyl group.

Specific examples of the substituents expressed by Wa and Wb may include halogen atoms (fluorine atom, chloride atom, bromine atom, iodine atom, etc.), alkyl groups (methyl group, ethyl group, n-propyl group, isopropyl group, tert-butyl group, n-octyl group, 2-ethylhexyl group, etc.), cycloalkyl groups (cyclohexyl group, cyclopentyl group, 4-n-dodecyl cyclohexyl group, etc.), alkenyl groups (vinyl group, aryl group, etc.), cycloalkenyl groups (2-cyclopentene-1-yl, 2-cyclohexane-1-yl groups, etc.), alkynyl groups (ethynyl group, propagyl group, etc.), aryl groups (phenyl group, p-tryl group, naphthyl group, etc.), hetero ring groups (2-furyl group, 2-thienyl group, 2-pyrimidinyl group, 2-benzothiazolyl group, etc.), cyano groups, hydroxyl groups, nitro groups, carboxyl groups, alkoxy groups (methoxy group, ethoxy group, isopropoxy group, tert-butoxy group, n-octyloxy group, 2-methoxyethoxy group, etc.), aryloxy groups (phenoxy group, 2-methyl phenoxy group, 4-tert-butyl phenoxy group, 3-nitro phenoxy group, 2-tetradecanoyl amino phenoxy group, etc.), acyloxy groups (formyloxy group, acetyloxy group, pivaloyloxy group, stearoyloxy group, benzoyloxy group, p-methoxyphenyl carbonyloxy group, etc.), amino groups (amino group, methyl amino group, dimethyl amino group, anilino group, N-methyl-anilino group, diphenyl amino group, etc.), acyl amino groups (formyl amino group, acetyl amino group, pivaloyl amino group, lauloyl amino group, benzoyl amino group, etc.), alkyl and aryl sulfonyl amino groups (methylsulfonyl amino group, butylsulfonyl amino group, phenylsulfonyl amino group, 2,3,5-trichlorophenyl sulfonyl amino group, p-methyl phenylsulfonyl amino group, etc.), mercapto groups, alkylthio groups (methylthio group, ethylthio group, n-hexadecylthio group, etc.), arylthio groups (phenylthio group, p-chlorophenylthio group, m-methoxyphenylthio group, etc.), sulfamoyl groups (N-ethyl sulfamoyl group, N-(3-dodecyloxy propyl)sulfamoyl group, N,N-dimethylsulfamoyl group, N-acetylsulfamoil group, N-benzoylsulfamoyl group, N—(N' phenylcarbamoyl)sulfamoyl group, etc.), sulfo groups, acyl groups (acetyl group, pivaloylbenzoyl group, etc.) and carbamoyl groups (carbamoyl group, N-methylcarbamoyl group, N,N-dimethylcarbamoyl group, N, N-di-n-octylcarbamoyl group, N-(methylsulfonyl)carbamoyl group, etc.).

The above substituents may be replaced by the above groups.

(1) The following structure can be cited when Wa and Wb are bonded to each other to form a ring.

When Wa and Wb are bonded to each other to form a ring, a compound preferably includes a nitrogen-containing 5-membered ring or a sulfur-containing 5-membered ring and is particularly preferably expressed by the following general expression (1) or (2).

[Chemical Formula 3]

GENERATION EXPRESSION (1)

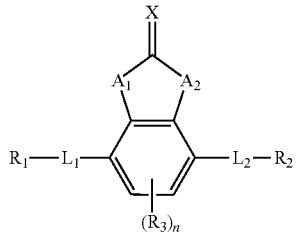

In the generation expression (1), $A_1$, $A_2$ independently denote —O—, —S—, —NRx- (Rx denotes a hydrogen atom or a substituent) or CO—. Examples of the substituent denoted by Rx are synonymous with the specific examples of the substituents denoted by Wa, Wb. Rx is preferably a hydrogen atom, an alkyl group, an aryl group or a hetero ring group. In the generation expression (1), X denotes a non-metal atom of a group 14 to 16. X is preferably =O, =S, =NRc or =C(Rd)Re. Here, Rc, Rd and Re denote substituents and examples thereof are synonymous with the specific examples of the substituents denoted by Wa, Wb. $L_1$, $L_2$, $R_1$, $R_2$, $R_3$ and n are synonymous with $L_1$, $L_2$, $R_1$, $R_2$, $R_3$ and n in the generation expression (A).

[Chemical Formula 4]

GENERAL EXPRESSION (2)

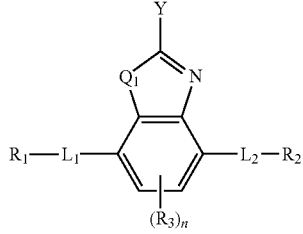

In the generation expression (2), $Q_1$ denotes —O—, —S—, —NRy- (Ry denotes a hydrogen atom or a substituent), —CRaRb— (Ra and Rb denote a hydrogen atom or a substituent) or CO—. Here, Ry, Ra and Rb denote substituents and examples thereof are synonymous with the specific examples of the substituents denoted by Wa, Wb.

Y denotes a substituent. Examples of the substituent denoted by Y are synonymous with the specific examples of the substituents denoted by Wa, Wb. Y is preferably an aryl group, a hetero ring group, an alkenyl group or an alkynyl group. A phenyl group, a naphtyl group, an anthryl group, a phenanthryl group, and a biphenyl group and the like can be cited as the aryl group denoted by Y. A phenyl group and a naphtyl group are preferable, and a phenyl group is more preferable.

Hetero ring groups including at least one heteroatom such as a nitrogen atom, an oxygen atom or a sulfur atom such as a furyl group, a prolyl group, a thienyl group, a pyridinyl group, a thiazolyl group and a benzothiazolyl group can be cited as the hetero ring group. A furyl group, a pyrrolyl group, a thienyl group, a pyridinyl group and a thiazolyl group are preferable.

These aryl groups or hetero ring groups may include at least one substituent. Examples of the substituent may include a halogen atom, an alkyl group having a carbon number of 1 to 6, a cyano group, a nitro group, an alkyl sulfinyl group having a carbon number of 1 to 6, an alkyl sulfonyl group having a carbon number of 1 to 6, a carboxyl group, a fluoroalkyl group having a carbon number of 1 to 6, an alkoxyl group having a carbon number of 1 to 6, an alkylthio group having a carbon number of 1 to 6, an N-alkyl amino group having a carbon number of 1 to 6, an N,N-dialkyl amino group having a carbon number of 2 to 12, an N-alkyl sulfamoyl group having a carbon number of 1 to 6 and an N,N-dialkyl sulfamoyl group having a carbon number of 2 to 12.

$L_1$, $L_2$, $R_1$, $R_2$, $R_3$ and n are synonymous with $L_1$, $L_2$, $R_1$, $R_2$, $R_3$ and n in the generation expression (A).

(2) A specific example of the generation expression (A) when at least one of Wa and Wb has a ring structure is preferably the following generation expression (3).

[Chemical Formula 5]

GENERAL EXPRESSION (3)

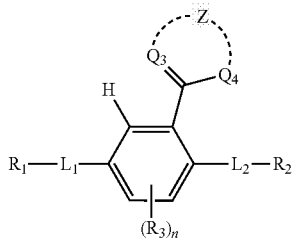

In the generation expression (3), $Q_3$ denotes =N— or =CRz- (Rz denotes a hydrogen atom or a substituent) and $Q_4$ denotes a non-metal atom of a group 14 to 16. Z denotes a nonmetal atom group that forms a ring together with $Q_3$ and $Q_4$. The ring formed from $Q_3$, $Q_4$ and Z may be further condensed with another ring. The ring formed from $Q_3$, $Q_4$ and Z is preferably a nitrogen-containing 5-membered ring or 6-membered ring condensed with a benzene ring. $L_1$, $L_2$, $R_1$, $R_2$, $R_3$ and n are synonymous with $L_1$, $L_2$, $R_1$, $R_2$, $R_3$ and n in the generation expression (A).

(3) When at least one of Wa and Wb is an alkenyl group or an alkynyl group, it is preferably a vinyl group or an ethynyl group including a substituent.

Out of the compounds expressed by the above generation expressions (1), (2) and (3), those expressed by the generation expression (3) are particularly preferable.

The compounds expressed by the generation expression (3) are excellent in heat resistance and light resistance as compared with those expressed by the generation expression (1) and are good in solubility to an organic solvent and compatibility with polymers as compared with those expressed by the general expression (2).

The compound expressed by the general expression (A) of the present invention can be contained by adjusting an amount appropriate to impart desired wavelength dispersion and oozing preventing property. Preferably 1 to 15 mass % and particularly preferably 2 to 10 mass % of the compound is added to the cellulose derivative. Within this range, sufficient wavelength dispersion and oozing preventing property can be imparted to the cellulose derivative of the present invention.

Note that the compounds expressed by the generation expressions (A), (1), (2) and (3) can be synthesized by referring to a known method. Specifically, they can be synthesized by referring to Journal of Chemical Crystallography (1997): 27(9); 512-526, Japanese Unexamined Patent Publications Nos. 2010-31223 and 2008-107767, and the like.

(Cellulose Acylate)

A cellulose acylate film usable in the present invention mainly contains cellulose acylate.

The cellulose acylate film usable in the present invention contains 60 to 100 mass % of cellulose acylate to total 100 mass % of the film. Further, a total degree of acyl substitution of cellulose acylate is 2.0 or higher and below 3.0 and more preferably 2.2 to 2.7.

Esters of celluloses and aliphatic carboxylic acids and/or aromatic carboxylic acids having a carbon number of about 2 to 22 can be cited as cellulose acylate, and esters of celluloses and lower fatty acids having a carbon number of 6 or smaller are particularly preferable.

An acyl group to be bonded to a hydroxyl group of cellulose may be a straight chain, may be branched or may form a ring. Further, it may be replaced by another substituent. If the degree of substitution is the same, birefringence is reduced when the aforementioned carbon number is large. Thus, selection among acyl groups having a carbon number of 2 to 6 is preferable, and the sum of a degree of propionyl substitution and a degree of butyryl substitution is 0.5 or higher. The carbon number of the cellulose acylate is preferably 2 to 4 and more preferably 2 to 3.

Specifically, mixed fatty acid esters of celluloses in which a propionate group, a butyrate group or a phthalyl group is bonded besides an acetyl group such as cellulose acetate propionate, cellulose acetate butyrate, cellulose acetate propionate or cellulose acetate phthalate can be used as cellulose acylate. Note that a butyryl group forming butyrate may be a straight chain or branched.

In the present invention, cellulose acetate, cellulose acetate butyrate or cellulose acetate propionate is particularly preferably used as cellulose acylate.

The cellulose acylate according to the present invention preferably satisfies the following expressions (iii) and (iv) simultaneously.

$$2.0 \leq X+Y < 3.0 \qquad \text{Expression (iii)}$$

$$0.5 \leq X \qquad \text{Expression (iv)}$$

In the expressions, Y denotes a degree of substitution of acetyl group and X denotes a degree of substitution of propionyl group or butyryl group or a mixture thereof.

To obtain optical properties suitable for purpose, resins having different degrees of substitution may be used by being mixed. A mixing ratio at that time is preferably 1:99 to 99:1 (mass ratio).

Among those described above, cellulose acetate propionate is particularly preferably used as cellulose acylate. In cellulose acetate propionate, it is preferable that $0 \leq Y \leq 2.5$ and $0.5 \leq X \leq 3.0$ (however, $2.0 \leq X+Y < 3.0$) and more preferably that $0.5 \leq Y \leq 2.0$ and $1.0 \leq X \leq 2.0$ (however, $2.0 \leq X+Y < 3.0$). Note that the degree of acyl group substitution can be measured in accordance with ASTM-D817-96.

It is preferable that a number average molecular weight of cellulose acylate is in a range of 60000 to 300000 since the mechanical strength of the obtained long stretched film is increased. More preferably, cellulose acylate having a number average molecular weight of 70000 to 200000 is used.

A weight average molecular weight (Mw) and a number average molecular weight (Mn) of cellulose acylate are measured using gel permeation chromatography (GPC). Measurement conditions are as follows. Note that this measurement method can be also used as a measurement method for other polymers in the present invention.

Solvent: methylene chloride;
Column: three columns, Shodex K806, K805 and K803G (produced by Showa Denko K.K.) are used;
Column temperature: 25° C.;
Sample Concentration: 0.1 mass %;
Detector: RI Model 504 (produced by GL Sciences Inc.);
Pump: L6000 (produced by Hitachi, Ltd.)
Flow rate: 1.0 ml/min
Calibration curve: Standard polystyrene STK, a calibration curve by 13 samples of standard polystyrene (produced by Tosoh Corporation) Mw=1000000 to 500 is used. 13 samples are used substantially at equal intervals.

A remaining sulfur content in cellulose acylate is preferably in a range of 0.1 to 45 mass ppm in terms of sulfur element. These are thought to be contained in the form of salts. If the remaining sulfur content exceeds 45 mass ppm, there is a tendency to be fractured during thermal stretching and during slitting after thermal stretching. Note that the remaining sulfur content is more preferably in a range of 1 to 30 mass ppm. The remaining sulfur content can be measured by a method prescribed in ASTM D817-96.

A free acid content in cellulose acylate is preferably in a range of 1 to 500 mass ppm. It is preferable that the free acid content is in the above range since fracture is unlikely to occur as in the above case. Note that the free acid content is preferably in a range of 1 to 100 mass ppm, which makes fracture more unlikely, and particularly preferably in a range of 1 to 70 mass ppm. The free acid content can be measured by a method prescribed in ASTM D817-96.

It is preferable to cleanse the synthesized cellulose acylate more sufficiently than in the case of being used in a solution casting method since a remaining alkaline earth metal content, a remaining sulfur content and a remaining acid content can be set in the above ranges.

Further, cellulose acylate preferably contains few luminescent spots when being formed into the long stretched film. Luminescent spots mean points (spots) seen due to leaking light from an opposite side when two polarizing plates are arranged in a cross Nicol state, an optical film or the like is placed therebetween, light is emitted from the side of one polarizing plate and observation is made from the side of the other polarizing plate. The luminescent spots having a diameter of 0.01 mm or longer are preferably at a density of $200/cm^2$ or less, more preferably at a density of $100/cm^2$ or less, further preferably at a density of $50/cm^2$ or less, even more preferably at a density of $30/cm^2$ or less, particularly preferably at a density of $10/cm^2$ or less and most preferably at a density of 0.

The luminescent spots having a diameter of 0.005 to 0.01 mm are also preferably at a density of $200/cm^2$ or less, more preferably at a density of $100/cm^2$ or less, further preferably at a density of $50/cm^2$ or less, even more preferably at a density of $30/cm^2$ or less, particularly preferably at a density of $10/cm^2$ or less and most preferably at a density of 0.

Raw material cellulose of cellulose acylate is not particularly limited, but cotton linter, wood pulp, kenaf and the like can be cited. Further, cellulose acylates obtained therefrom can be used while being mixed at an arbitrary ratio.

Cellulose acylate can be produced by a known method. Specifically, it can be synthesized, for example, by referring to Japanese Unexamined Patent Publication No. H10-45804.

Further, cellulose acylate is also affected by trace metal components in cellulose acylate. These trace metal components are thought to be related to water used in the production process. Less components which can become insoluble nuclei are preferable. Particularly, metal ions of iron, calcium, magnesium and the like may form insoluble matters by forming salts with polymer decomposition products possibly containing organic acid groups and, hence, few metal ions are preferable. Further, calcium (Ca) components easily form coordination compounds (i.e. complexes) with acid components such as carboxylic acid and sulfonic acid and many ligands and may form scum (insoluble sediments, turbidity) derived from lots of insoluble calcium and, hence, few calcium components are preferable.

Specifically, a content of iron (Fe) components in cellulose acylate is preferably 1 mass ppm or less. Further, a content of calcium (Ca) components in cellulose acylate is preferably 60 mass ppm or less, and more preferably 0 to 30 mass ppm. Furthermore, a content of magnesium (Mg) components in cellulose acylate is preferably 0 to 70 mass ppm, and particularly preferably 0 to 20 mass ppm since an excessive content produces insoluble matters.

Note that the contents of metal components such as the content of iron (Fe) components, the content of calcium (Ca) components and the content of magnesium (Mg) components can be analyzed using an ICP-AES (inductive coupling plasma atomic emission spectrometer) after absolutely dried cellulose acylate is pre-treated by a micro digest wet decomposition apparatus (sulfuric and nitric acid decomposition) and alkaline melting.

(Additives)

The long stretched film obtained by the present invention may be appropriately mixed with polymer components other than cellulose ester to be described later. Polymer components to be mixed are preferably excellent in compatibility with cellulose ester and a transmissivity when the long stretched film is formed is 80% or higher, preferably 90% or higher and further preferably 92% or higher.

Examples of the additive to be added may include a plasticizer, an ultraviolet absorbing agent, a retardation regulating agent, an antioxidant, a deterioration preventing agent, a release assistant, a surface-active agent, a dye, fine particles and the like. In this embodiment, additives other than fine particles may be added in preparing a cellulose ester solution or may be added in preparing a fine particle dispersion liquid. A polarizing plate used in an image display device such as an organic EL display is preferably added with a plasticizer, an antioxidant, an ultraviolet absorbing agent and the like that impart heat resistance and moisture resistance.

These compounds are preferably contained in cellulose ester in a range of 1 to 30 mass % and preferably in a range of 1 to 20 mass %. Further, to suppress bleed-out and the like during stretching and drying, compounds preferably have a vapor pressure of 1400 Pa or lower at 200° C.

These compounds may be added together with cellulose ester and a solvent in preparing the cellulose ester solution or may be added during or after the preparation of the solution.

(Retardation Regulating Agent)

An aromatic compound having two or more aromatic rings as disclosed in European Patent Publication No. 911,656A2 can be used as a compound to be added to regulate retardation.

Further, two or more kinds of aromatic compounds may be used in combination. Aromatic rings of the aromatic compounds include aromatic hetero rings in addition to aromatic hydrocarbon rings. The aromatic hetero rings are particularly preferable and generally unsaturated hetero rings. Among them, 1,3,5-triazine rings are particularly preferable.

(Polymer or Oligomer)

A cellulose ester film in this embodiment preferably contains cellulose ester and a polymer or oligomer of a vinyl-based compound including a substituent selected from a carboxyl group, a hydroxyl group, an amino group, an amide group and a sulfo group and having a weight average molecular weight in a range of 500 to 200,000. A content mass ratio of the cellulose ester and the polymer or oligomer is preferably in a range of 95:5 to 50:50.

(Matting Agent)

In this embodiment, fine particles can be contained as a matting agent in the long stretched film, whereby the stretched film can be easily conveyed and wound when being long.

The matting agent is preferably composed of primary or secondary particles having a particle diameter of 10 nm to 0.1 µm. A substantially spherical matting agent composed of primary particles having an aspect ratio of 1.1 or lower is preferably used.

The fine particles preferably contain silicon and particularly preferably silicon dioxide. Examples of silicon dioxide fine particles preferable in this embodiment may include particles commercially available under the name of Aerosil R972, R972V, R974, R812, 200, 200V, 300 R202, OX50, TT600 (produced by Nippon Aerosil Co., Ltd.), and Aerosil 200V, R972, R972V, R974, R202 and R812 can be preferably used. Examples of polymer fine particles may include silicone resins, fluororesins and acrylic resins. Silicone resins are preferable and those having a three-dimensional network structure are particularly preferable, and examples thereof may include Tospearl 103, 105, 108, 120, 145, 3120 and 240 (produced by Momentive Performance Materials Inc.).

Silicon dioxide fine particles preferably have a primary average particle diameter of 20 nm or shorter and an apparent specific gravity of 70 g/L or more. An average diameter of the primary particles is preferably 5 to 16 nm and further preferably 5 to 12 nm. An average diameter of the primary particles is preferably small because of low haze. An apparent specific gravity is preferably 90 to 200 g/L and more preferably 100 to 200 g/L. As the apparent specific gravity increases, it becomes possible to prepare a fine particle dispersion liquid having a high concentration, which is preferable since haze does not occur and aggregates are not produced.

An added amount of the matting agent in this embodiment is preferably 0.01 to 1.0 g, more preferably 0.03 to 0.3 g and further preferably 0.08 to 0.16 g per 1 $m^2$ of the long stretched film.

(Other Additives)

Besides, a heat stabilizer such as inorganic fine particles such as kaoline, talc, diatomaceous earth, quartz, calcium carbonate, barium sulfate, titanium oxide and alumina and salts of alkaline earth metals such as calcium and magnesium may be added. Further, a surface-active agent, a release assistant, an antistat, a flame retardant, a lubricant, oil and the like may be added.

A cellulose ester-based resin film usable in the present invention can be formed by known methods, among which solution casting methods and melt casting methods are preferable.

<Polycarbonate-Based Resin>

Next, polycarbonate-based resin is described.

Various polycarbonate-based resins can be used without being particularly limited. In terms of chemical properties and physical properties, aromatic polycarbonate resins are preferable and bisphenol A-based polycarbonate resins are particularly preferable. Among them, those using a bisphenol A derivative obtained by introducing a benzene ring, a cyclohexane ring, an aliphatic hydrocarbon group and the like into bisphenol A are more preferable. Further, polycarbonate resins obtained using a derivative obtained by introducing the above functional groups asymmetrically into a carbon in the center of bisphenol A and structured to reduce anisotropy in a unit molecule are particularly preferable. For example, polycarbonate resins obtained using bisphenol A in which two methyl groups of a carbon in the center of bisphenol A are replaced by a benzene ring, those obtained by replacing one hydrogen of each benzene ring of bisphenol A by a methyl group, a phenyl group or the like asymmetrically with respect to a center carbon are particularly preferable as such polycarbonate resins. Specific examples may include polycarbonate resins obtained from 4,4'-dihydroxydiphenyl alkanes and halogen substituents of these by a phosgene method or transesterification such as 4,4'-dihydroxydiphenyl methane, 4,4'-dihydroxydiphenyl ethane and 4,4'-dihydroxydiphenyl butane. Besides these, examples may include polycarbonate resins described in Japanese Unexamined Patent Publications Nos. 2006-215465, 2006-91836, 2005-121813, 2003-167121.

The polycarbonate resin may be used by being mixed with transparent resin such as polystyrene-based resin, methyl methacrylate-based resin and cellulose acetate-based resin. Further, a resin layer containing polycarbonate resin may be laminated on at least one surface of a resin film formed using cellulose acetate-based resin.

The polycarbonate-based resin preferably has a glass transition temperature (Tg) of 110° C. or higher and a water absorption (value measured in water of 23° C. for 24 hours) of 0.3% or lower. The polycarbonate-based resin more preferably has a Tg of 120° C. or higher and a water absorption of 0.2% or lower.

A polycarbonate-based resin film usable in the present invention can be formed by known methods, among which solution casting methods and melt casting methods are preferable.

Next, a method for forming a thermoplastic resin film is described. In the following description, a method for forming a long film of cellulose ester-based resin is described as an example.

<Solution Casting Method>

A solution casting method is preferable in terms of suppressing the coloring of the film, foreign matter defects and optical defects such as die lines and providing the flatness and transparency of the film.

(Organic Solvent)

Any organic solvent can be used without limitation as an organic solvent useful to form a dope in the case of forming the cellulose ester-based resin film according to the present invention by the solution casting method as long as it can simultaneously dissolve cellulose acetate and other additives.

Examples of a chlorine containing organic solvent may include methylene chloride and examples of a chlorine-free organic solvent may include methyl acetate, ethyl acetate, amyl acetate, acetone, tetrahydrofuran, 1,3-dioxolane, 1,4-dioxane, cyclohexane, ethyl formate, 2,2,2-trifluoroethanol, 2,2,3,3-hexafluoro-1-propanol, 1,3-difluoro-2-propanol, 1,1,1,3,3,3-hexafluoro-2-methyl-2-propanol, 1,1,1,3,3,3-hexafluoro-2-propanol, 2,2,3,3,3-pentafluoro-1-propanol and nitroethane. Methylene chloride, methyl acetate, ethyl acetate and acetone can be preferably used.

The dope preferably contains a straight or branched-chain aliphatic alcohol of 1 to 40 mass % having a carbon number of 1 to 4 besides the above organic solvent. As a ratio of alcohol in the dope increases, a web is gelled and easily peeled from a metal support. If the ratio of alcohol is small, it also functions to promote the dissolution of cellulose acetate in a chlorine-free organic solvent system.

Particularly, a dope composition is preferably obtained by dissolving at least 15 to 45 mass % of acrylic resin, cellulose ester resin and acrylic particles in total in a solvent containing methylene chloride and straight or branched-chain aliphatic alcohol having a carbon number of 1 to 4.

Examples of the straight or branched-chain aliphatic alcohol having a carbon number of 1 to 4 may include methanol, ethanol, n-propanol, iso-propanol, n-butanol, sec-butanol and tert-butanol. Among these, ethanol is preferable in terms of dope stability, relative low boiling point and dryness.

(Solution Casting)

A solution casting method is composed of a step of preparing a dope by dissolving resin and additives in a solvent, a step of casting the dope onto a belt-like or drum-like metal support, a step of drying the cast dope as a web, a step of peeling the dope from the metal support, a step of stretching or keeping a width, a step of further drying and a step of winding a finished long stretched film.

A high concentration of cellulose acetate in the dope is preferable since a drying load after casting onto the metal support can be reduced. However, if the concentration of cellulose acetate is too high, a load during filtering increases to degrade filtering accuracy. A concentration capable of combining these is preferably 10 to 35 mass % and further preferably 15 to 25 mass %. The metal support in the casting step preferably has a mirror-finished surface, and a stainless steel belt or a drum having a surface plated by a casting is preferably used as the metal support.

A surface temperature of the metal support in the casting step is set at −50° to a temperature at which the solvent is not boiled to foam. A higher temperature is preferable since the web can be dried at a faster rate. However, if the temperature is too high, the web may be foamed or the flatness thereof may be deteriorated.

A preferable support temperature is appropriately set in a range of 0 to 100° C. and further preferably in a range of 5 to 30° C. Alternatively, it is also a preferable method to gel the web by cooling and peel the web from the drum in a state containing a lot of remaining solvent. A method for controlling the temperature of the metal support is not particularly limited. A method for blowing hot or cold air and a method for bringing hot water into contact with the underside of the metal support are known as such. The use of hot water is preferable since heat is efficiently transferred and, hence, a time until the temperature of the metal support becomes constant is short.

In the case of using hot air, hot air having a temperature not lower than a boiling point of the solvent and higher than a target temperature may be used while preventing foaming in consideration of a temperature reduction of the web due to evaporation latent heat of the solvent.

Particularly, it is preferable to efficiently perform drying while changing the temperature of the support and the temperature of the drying air during a period from casting to peeling.

In order for the cellulose ester-based resin film to exhibit good flatness, a remaining solvent amount when the web is peeled from the metal support is preferably 10 to 150 mass %, further preferably 20 to 40 mass % or 60 to 130 mass % and particularly preferably 20 to 30 mass % or 70 to 120 mass %.

The remaining solvent amount is defined by the following equation.

$$\text{Remaining solvent amount(mass \%)} = \{(M-N)/N\} \times 100$$

Note that M denotes a mass of a sample collected at an arbitrary point of time during or after the production of the web or the long film and N denotes a mass after heating the sample at 115° C. for 1 hour.

Further, in the step of drying the cellulose-based resin film, the web is peeled from the metal support and further dried such that the remaining solvent amount is reduced to preferably 1 mass % or less, further preferably 0.1 mass % or less and particularly preferably 0 to 0.01 mass %.

In the film drying step, a roll drying method (method for alternately passing a web through a multitude of rolls arranged at upper and lower sides) and a method for drying a web while conveying the web by a tenter method are generally adopted.

<Melt Casting Method>

A melt casting method is a preferable film formation method in terms of easily reducing retardation Rt in a thickness direction after oblique stretching and providing excellent dimensional stability of the film due to a small remaining volatile component amount. The melt casting method means heating and melting a composition containing resin and additives such as a plasticizer to a temperature at which the composition exhibits fluidity and, thereafter, casting a melt containing fluid cellulose acetate. Formation methods by melt casting can be classified into a melt extrusion molding method, a press molding method, an inflation method, an injection molding method, a blow molding method, a stretch molding method and the like. Among these, the melt extrusion method capable of providing a long film excellent in mechanical strength and surface accuracy is preferable.

A plurality of raw materials used in melt extrusion are preferably normally kneaded and formed into pellets in advance.

Pellets may be formed by a known method. For example, pellets can be formed by supplying dry cellulose acetate, a plasticizer and other additives to a single- or double-screw extruder by a feeder, kneading them using the extruder, extruding the kneaded material in the form of a strand from a die, cooling the strand with water or air and cutting the strand.

The additives may be mixed before being supplied to the extruder or may be supplied by different feeders.

A small amount of additives such as particles and an antioxidant are preferably mixed in advance for uniform mixing.

The extruder preferably works at a temperature which is as low as possible and at which a shear force can be suppressed and pellet formation is possible in such a manner that the resin is not degraded (molecular weight reduction, coloring, gel production, etc.). For example, in the case of a double-screw extruder, two deep groove type screws are preferably rotated in the same direction. An engaged type is preferable in terms of kneading homogeneity.

A film is formed using the pellets obtained as described above. Of course, a film can also be formed by supplying raw material powder as it is to the extruder by the feeder without forming pellets.

A melting temperature when the above pellets are extruded using a single- or double-screw extruder is set at about 200 to 300° C., the melt is cast in the form of a film from a T-die after being filtered by a leaf-disc type filter or the like to remove foreign matters, and the film is nipped by a cooling roll and an elastic touch roll and solidified on the cooling roll.

When being introduced into the extruder from a supply hopper, the pellets are preferably fed under vacuum or decompression or under an inert gas atmosphere to prevent oxidative decomposition and the like.

An extrusion flow rate is preferably stably controlled such as by introducing a gear pump. Further, a stainless steel fiber sintered filter is preferably used as the filter used to remove foreign matters. The stainless steel fiber sintered filter is formed by compressing a stainless steel fiber body in a complicatedly entangled state and sintering at contact positions to unite, and filtering accuracy can be adjusted by changing a density based on the thickness of fibers and a compression amount.

The additives such as the plasticizer and particles may be mixed with the resin in advance or may be kneaded in the extruder. A mixing device such as a static mixer is preferably used for uniform mixing.

A film temperature on the touch roller side when the film is nipped by the cooling roll and the elastic touch roll is preferably set at Tg of the film or higher and Tg+110° C. or lower. A known roll can be used as the roll having an elastic surface used for such a purpose.

The elastic touch roll is also called a compressive rotary body. A commercially available one can be used as the elastic touch roll.

When the long film is peeled from the cooling roll, a tension is preferably controlled to prevent the deformation of the long film.

The long film may be a single-layer film or a laminated film composed of two or more layers. The laminated film can be obtained by known methods such as a co-extrusion molding method, a co-casting molding method, a film lamination method and a coating method. Among these, the co-extrusion molding method and the co-casting molding method are preferable.

The long film formed by the above method is conveyed to the stretching device described above and stretched in an oblique direction.

A thickness of the long film is preferably 20 to 400 μm and more preferably 30 to 200 μm.

In the present invention, thickness unevenness σm in a flowing direction of the long film supplied to be stretched is below 0.30 μm, preferably below 0.25 μm and further preferably below 0.20 μm in terms of keeping a take-up tension of the long film at the entrance of the above oblique stretching tenter constant and stabilizing optical properties such as the orientation angle and retardation. If the thickness unevenness σm in the flowing direction of the long film is not below 0.30 μm, variations of the optical properties of the long stretched film such as the retardation and orientation angle are notably deteriorated.

A long film having a thickness gradient in the width direction may be supplied as the long film. The thickness gradient of the long film can be empirically obtained by experimentally stretching long films having various thickness gradients such that a film thickness at a position where stretching in a subsequent step is completed can be most uniform. The thickness gradient of the long film can be, for example, so adjusted that a thicker end part is thicker than a thinner end part by about 0.5 to 3%.

A width of the long film is not particularly limited, but can be set at 500 to 4000 mm and preferably at 1000 to 2000 mm.

A preferable modulus of elasticity at a stretching temperature when the long film is obliquely stretched is 0.01 MPa or higher and 5000 MPa or lower and further preferably 0.1 MPa or higher and 500 MPa or lower in Young's modulus. If the modulus of elasticity is too low, a shrinkage ratio during/after stretching decreases and it becomes difficult to unwrinkle. If the modulus of elasticity is too high, a tension applied during stretching increases and parts for holding the opposite side edge parts of the long film need to be strengthened, which increases a load applied to the tenter in the subsequent step.

A non-oriented long film may be used or a long film oriented in advance may be supplied as the long film. Further, if necessary, a widthwise orientation distribution of the long film may be arched or bowed. In short, a state of orientation of the long film can be so adjusted as to attain a desired orientation of the long stretched film at a position where stretching in the subsequent step is completed.

(Oblique Stretching Step)

The oblique stretching step is as already described. The long stretched film after the oblique stretching step is obliquely stretched in a direction of an angle exceeding 0° and below 90° with respect to the width direction of the long film. The stretched long stretched film is wound in the subsequent winding step.

(Winding Step)

A winding device is provided at the exit of the oblique stretching device. The winding device can finely control the take-up position and angle of the long stretched film and wind the long stretched film having small variations of the film thickness and optical values by being arranged in such a manner as to take up the long stretched film at a predetermined angle with respect to the stretching device. Thus, the wrinkling of the long stretched film can be effectively prevented and a winding property of the long stretched film is improved, wherefore the stretched film having a long length can be wound. In this embodiment, a take-up tension T (N/m) of the long film after stretching is preferably adjusted in a range of 100 N/m<T<300 N/m and preferably in a range of 150 N/m<T<250 N/m.

If the take-up tension is equal to or lower than 100 N/m, the long stretched film is likely to be slackened or wrinkled and the retardation and a profile of the orientation axis in the width direction tend to be deteriorated. On the other hand, if the take-up tension is equal to or higher than 300 N/m, a variation of the orientation angle in the width direction is deteriorated and widthwise take-up efficiency (take-up efficiency in the width direction) tends to be deteriorated.

Further, in this embodiment, a fluctuation of the above take-up tension T is preferably controlled with an accuracy of below ±5% and preferably below ±3%. If the fluctuation of the above take-up tension T is not below ±5%, variations of optical properties in the width direction and flowing direction increase. A method for measuring a load applied to the first roll at the exit part of the tenter, i.e. a tension of the long stretched film and controlling a rotation speed of a take-up roll by a general PID control method so that the measured value is constant can be cited as a method for controlling the fluctuation of the above take-up tension T in the above range. A method for attaching a load cell to a bearing portion of a roll and measuring a load applied to the roll, i.e. a tension of a long stretched film can be cited as a method for measuring the load. A known tension or compression type load cell can be used as the load cell.

The long film after stretching is released from the gripping tools, discharged from the exit of the tenter, successively wound on a winding core (winding roll) to be formed into a rolled body of the long stretched film.

Further, it is desirable to trim the opposite ends (opposite sides) of the long stretched film for the purpose of cutting off grip marks on the opposite sides of the long stretched film gripped by the gripping tools and obtaining a desired width.

The trimming may be performed at once or may be performed separately a plurality of times.

Further, after being wound, the long stretched film may be delivered again, the opposite ends thereof may be trimmed and the trimmed long stretched film may be wound again to form a rolled body of the long stretched film if necessary.

Further, a masking film may be placed on the long stretched film before the long stretched film is wound and simultaneously wound for the purpose of preventing the blocking of the long stretched film or the long stretched film may be wound while a tape or the like is bonded to at least one end, preferably both ends of the long stretched film. The masking film is not particularly limited as long as it can protect the long stretched film. For example, a polyethylene terephthalate film, a polyethylene film, a polypropylene film and the like can be cited as such.

<Long Stretched Film>

The orientation angle of the long stretched film obtained by the producing method of this embodiment is inclined in a range exceeding 0° and below 90° with respect to the winding direction. A specific value can be appropriately selected depending on an intended use. For examples, values such as 15°, 22.5°, 45°, 67.5° and 75° can be cited as such.

A variation of the widthwise orientation angle of the long stretched film obtained by the producing method of this embodiment is preferably 0.6° or smaller and further preferably 0.4° or smaller in the width of at least 1300 mm. If a circular polarizing plate is obtained by bonding a long stretched film having a variation of an orientation angle exceeding 0.6° to a polarizer and mounted in a self-luminous image display device such as an organic EL display, color unevenness may be caused at the time of displaying a black image.

A value of in-plane retardation of the long stretched film obtained by the producing method of this embodiment is preferably 120 nm or larger and 160 nm or smaller and further preferably 130 nm or larger and 150 nm or smaller. By setting the value of the in-plane retardation in the above range, outside light reflection can be suppressed and display quality can be improved in the case of use as a phase difference film of a circular polarizing plate for organic EL display.

A variation of the in-plane retardation of the long stretched film obtained by the producing method of this embodiment is preferably 3 nm or less and further preferably 1 nm or less in a length of at least 1300 mm in the width direction. By setting the variation of the in-plane retardation in the above range, color unevenness at the time of displaying a black image can be suppressed in the case of use as a phase difference film for organic EL display.

An optimal value is selected for the in-plane retardation of the long stretched film obtained by the producing method of this embodiment based on the design of a display device in which the long stretched film is to be used. Note that the in-plane retardation of the film is a value obtained by multiplying a difference between a refractive index nx in an in-plane slow axis direction and a refractive index ny in a direction perpendicular to the slow axis in the plane by an average thickness d of the long stretched film ((nx−ny)×d).

A film thickness of the long stretched film obtained by the producing method of this embodiment is, for example, preferably 10 to 200 μm, more preferably 10 to 60 μm and further preferably 10 to 35 μm in terms of mechanical strength.

Further, thickness unevenness in the width direction is preferably 3 μm or smaller and more preferably 2 μm or smaller since it affects whether or not the long stretched film can be wound.

<Circular Polarizing Plate>

In the circular polarizing plate of the present invention, a polarizing plate protection film, a polarizer, a λ/4 phase difference film (long stretched film obtained in the present invention) and an adhesive film are laminated in this order, and an angle between a slow axis of the λ/4 phase difference film and an absorption axis of the polarizer is 45°.

In the present invention, a long polarizing plate protection film, a long polarizer and a long λ/4 phase difference film are preferably laminated in this order.

The circular polarizing plate according to the present invention can be produced by using stretched polyvinyl alcohol doped with iodine or dichroic dye as the polarizer and bonding the polarizer and the λ/4 phase difference film.

A film thickness of the polarizer is 5 to 40 μm, preferably 5 to 30 μm and particularly preferably 5 to 20 μm.

The polarizing plate can be produced by a general method. The λ/4 phase difference film after an alkali saponification treatment is preferably bonded to one surface of the polarizer fabricated by immersing and stretching a polyvinyl alcohol-based film in an iodine solution, using a complete saponification type polyvinyl alcohol aqueous solution.

The polarizing plate can be formed by further bonding a release film to an opposite surface of the polarizing plate protection film of this polarizing plate. The protection film and the release film are used for the purpose of protecting the polarizing plate during the shipment of the polarizing plate, during the inspection of a product and the like.

Embodiment in Organic EL Display

Further, a λ/4 plate using the long stretched film of the embodiment of the present invention is particularly preferably used as a circular polarizing plate used to prevent the reflection of a self-luminous display device such as an organic EL display. The long stretched film according to the embodiment of the present invention can provide a display device particularly excellent in tinge uniformity in the case of use in an organic EL display due to excellent direction (orientation angle) uniformity of the slow axis in the width direction.

Figure 5:
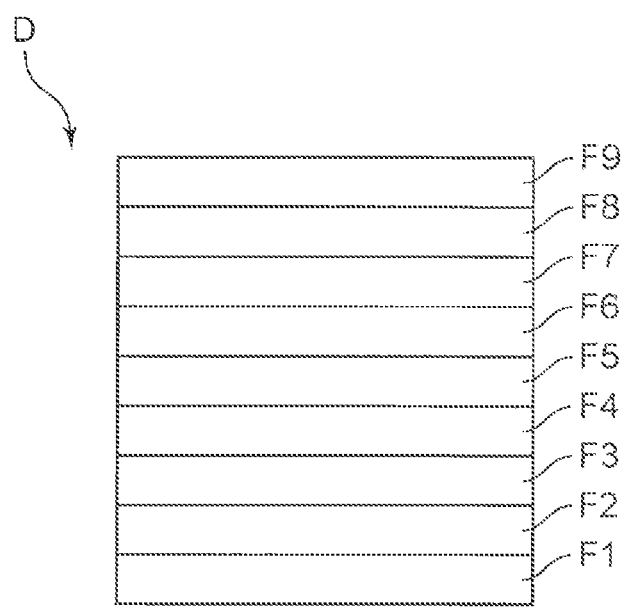
FIG. 5 is a schematic diagram of an organic EL display according to the embodiment of the present invention.

FIG. 5 shows an example of the configuration of an organic EL display D of the present invention. The present invention is not limited to this.

As shown in FIG. 5, the organic EL display D is formed by providing a circular polarizing plate, in which a polarizer F8 is sandwiched by a λ/4 phase difference film F7 and a protection film F9, on an organic EL element successively including a metal electrode F2, a luminous layer F3, a transparent electrode (ITO or the like) F4 and a sealing layer F5 on a substrate F1 using glass, polyimide and the like via an adhesive bath F6. A hardening layer is preferably laminated on the protection film F9. The hardening layer functions not only to prevent a surface of the organic EL display from being scratched, but also to prevent warpage caused by the circular polarizing plate. Further, an anti-reflection layer may be provided on the hardening layer. A thickness of the organic EL element itself is about 1 μm.

Generally, in an organic EL display, a metal electrode, a luminous layer and a transparent electrode are successively laminated on a transparent substrate to form an element (organic EL element) as a luminous body. Here, the luminous layer is a laminated body of various organic thin films and known to be composed of various combinations such a laminated body of a hole injection layer made of triphenyl amine derivative or the like and a luminous layer made of a fluorescent organic solid such as anthracene, a laminated body of such a luminous layer and an electron injection layer made of a perylene derivative or the like and a laminated body of these hole injection layer, luminous layer and electron injection layer.

The organic EL display emits light under the principle that holes and electrons are injected into the luminous layer by applying a voltage to the transparent electrode and the metal electrode, energy generated by recoupling of these holes and electrons excites fluorescent substances and the excited fluorescent substances radiate light when returning to a ground state. An intermediate recoupling mechanism is the same as in general diodes. As can be expected from this, a current and emission intensity exhibit strong nonlinearity associated with rectification in response to an applied voltage.

In the organic EL display, at least one electrode has to be transparent to extract light emitted from the luminous layer, and a transparent electrode formed from a transparent conductor such as indium tin oxide (ITO) is normally used as a positive electrode. On the other hand, to facilitate electron injection and increase emission efficiency, it is important to use a substance having a small work function as a negative electrode. Normally, metal electrodes such as Mg—Ag and Al—Li are used as such.

In the organic EL display thus configured, the luminous layer is formed as a very thin film having a thickness of about 10 nm. Thus, the luminous layer also substantially completely transmits light similarly to the transparent electrode. As a result, light incident on a surface of the transparent substrate, passing through the transparent electrode and the luminous layer and reflected by the metal electrode comes out to the surface side of the transparent substrate again when light is not emitted, wherefore a display surface of the organic EL display looks like a mirror surface when being viewed from outside.

The circular polarizing plate formed from the long stretched film produced using the present invention is suitable for organic EL displays in which such outside light reflection is particularly problematic.

Technical features of the above long stretched film producing method are summarized below.

A method for producing a long stretched film according to one aspect of the present invention includes at least a step of forming a long film made of thermoplastic resin, an oblique stretching step of delivering the long film in a specific direction different from a winding direction of a long stretched film after stretching and obliquely stretching the long film in a direction of an angle exceeding 0° and below 90° with respect to a width direction while gripping and conveying opposite end parts of the long film by a plurality of gripping tools of an oblique stretching device and a winding step of winding the long stretched film after the oblique stretching step, wherein the oblique stretching device includes gripping tool travel support tools at opposite sides of the traveling long film, each of the gripping tool travel support tools at the opposite sides includes a plurality of gripping tools, the same number of the gripping tools are provided at the opposite sides, and a combination of the gripping tools forming a gripping tool pair is constantly the same at grip start points where the long film is gripped by the gripping tools.

According to this configuration, the gripping tool returned to the grip start point after releasing the long stretched film can form the gripping tool pair again with the same gripping tool paired during stretching last time in the present invention. Further, since the gripping tools constituting the gripping tool pair are abraded or worn substantially to the same extent, the quality of the obtained long stretched film is less affected and the long stretched film can be provided which has a small variation of an orientation angle in the width direction in an obliquely stretched state.

In the oblique stretching step of the above producing method, travel route lengths and traveling speeds at the opposite sides per lap from the grip start points where the long film is gripped by the plurality of gripping tools of the gripping tool travel support tools at an entrance side of the oblique stretching device to the grip start points at the entrance side of the oblique stretching device by way of grip release pointswhere the long film is released are preferably equal. According to this configuration, the gripping tool traveling at an equal speed can constantly form the gripping tool pair with the same gripping tool as the one paired at first in the present invention. As a result, a variation of the orientation angle in the width direction caused by combinations of the gripping tools constituting the gripping tool pairs being different in each lap can be prevented.

In the oblique stretching step of the above producing method, the traveling speeds of the gripping tools are preferably increased and decreased until the gripping tools grip the long film again after releasing the long stretched film so that the gripping tools of the same combination are aligned at the grip start points. According to this configuration, by adjusting the traveling speeds of the gripping tools, the entire lengths of the gripping tool travel support tools need not be equal and a drastic design change of the device is not necessary. Further, how much the speeds of the gripping tools need to be adjusted can be calculated in advance when patterns of the gripping tool travel support tools and a stretching angle are adjusted. As a result, in the producing method of the present invention, in the case of changing the stretching angle or the like, such a change can be immediately dealt with and the gripping tools can be so adjusted that the same gripping tool pairs are constantly aligned at the grip start points, which is convenient.

In the oblique stretching step of the above producing method, a straight line connecting the grip release points where the gripping tools release the long stretched film is preferably parallel to the width direction of the long stretched film. According to this configuration, stresses applied to the long stretched film are cancelled out at opposite widthwise end parts of the long stretched film when the gripping tools release the long stretched film at the grip release points, wherefore thickness unevenness of the obtained long stretched film is reduced.

In the above producing method, an in-plane retardation of the long stretched film is preferably 120 to 160 nm. According to this configuration, outside light reflection can be suppressed and image display quality is improved in the case of use as a circular polarizing plate for organic EL display.

In the above producing method, the thermoplastic resin used for the long stretched film is preferably norbornene-based resin. According to this configuration, since a stretching stress is low, the end parts of the long stretched film are less likely to be wrinkled or shifted and a variation of the orientation angle in the width direction can be suppressed also when the long stretched film is conveyed at a high speed.

In the above producing method, a film thickness of the obtained long stretched film is preferably 10 to 35 μm. If the film thickness of the obtained long stretched film is in the above range, sensitivity to the variation of the orientation angle in the width direction is reduced and the variation of the orientation angle in the width direction can be reduced.

A long stretched film according to another aspect of the present invention is characterized by being produced by the above long stretched film producing method. Since this long stretched film is produced by the above producing method, a variation of an orientation angle in a width direction is small.

EXAMPLES

The present invention is specifically described by way of the following examples. The present invention is not limited to these.

<Production of Long Film>

In the film forming step, long films A to C were produced by the following method.

(Long Film A1)

The long film A1 was a cycloolefin-based resin film and produced by the following producing method.

After 1.2 mass parts of 1-hexane, 0.15 mass parts of dibutyl ether and 0.30 mass parts of triisobutylaluminum were poured into a reactor and mixed with 500 mass parts of dehydrated cyclohexane at a room temperature under a nitrogen atmosphere, a norbornene-based monomer mixture containing 20 mass parts of tricyclo[4.3.0.12,5]deca-3,7-diene (dicyclopentadiene, hereinafter, abbreviated as DCP), 140 mass parts of 1,4-methano-1,4,4a,9a-tetrahydrofluorene (hereinafter, abbreviated as MTF) and 40 mass parts of 8-methyl-tetracyclo[4.4.0.12,5.17,10]-dodeca-3-ene (hereinafter, abbreviated as MTD) and 40 mass parts of tungsten hexachloride (0.7% toluene solution) were continuously added and polymerized for 2 hours while being kept at 45° C. 1.06 mass parts of butyl glycidyl ether and 0.52 mass parts of isopropyl alcohol were added to the polymerization solution to inactivate a polymerization catalyst and stop a polymerization reaction.

Subsequently, 270 mass parts of cyclohexane was added to 100 mass parts of the obtained reaction solution containing a ring-opening polymer. After 5 mass parts of nickel-alumina catalyst (produced by JGC C&C) as a hydrogenation catalyst was further added, pressurized to 5 MPa by hydrogen and heated to 200° C. under stirring, the mixture was allowed to react for 4 hours to obtain a reaction solution containing 20% of DCP/MTF/MTD ring-opening polymer hydrogenated polymer.

After the hydrogenation catalyst was removed by filtering, soft polymer (produced by Kuraray Co., Ltd.; Septon 2002) and antioxidant (produced by Ciba Specialty Chemicals; Irganox 1010) were respectively added to and dissolved in the obtained solution (0.1 mass part per 100 mass parts of the polymer for both). Subsequently, cyclohexane as a solvent and other volatile components were removed from the solution using a cylindrical concentration dryer (produced by Hitachi Ltd.) and the hydrogenated polymer was extruded in a molten state in the form of a strand from an extruder, and formed into pellets and collected after being cooled. When a copolymerization ratio of each norbornene-based monomer in the polymer was calculated from a remaining composition of norbornenes in the solution after polymerization (by a gas chromatography method), it was DCP/MTF/MTD=10/70/20 which was substantially equal to charge composition. A weight average molecular weight (Mw) of this ring-opening polymer hydrogenated product was 31,000, a molecular distribution (Mw/Mn) thereof was 2.5, a hydrogenation rate thereof was 99.9% and Tg thereof was 134° C.

The obtained pellets of the ring-opening polymer hydrogenated product were dried at 70° for 2 hours to remove moisture using a hot air dryer in which air was allowed to flow. Subsequently, the pellets were molded by melt extrusion to form a cycloolefin polymer film having a thickness of 75 μm using a single-screw extruder (produced by Mitsubishi Heavy Industries, Ltd.; screw diameter was 90 mm, T-die lip was made of tungsten carbide, peel strength from molten resin was 44 N) having a coat hanger type T-die. Extrusion molding was performed in a clean room with a class of 10,000 or less on molding conditions, i.e. a molten resin temperature of 240° C. and a T-die temperature of 240° C. to obtain the long film A1 having a length of 1000 mm.

(Long Film A2)

The long film A2 was obtained in the same manner as for the long film A1 except that a die gap of the T-die lip was appropriately adjusted to attain a thickness of 35 μm after melt extrusion molding in the method for producing the long film A1.

(Long Film B1)

The long film B1 was a cellulose ester-based resin film and produced by the following producing method.

<Fine Particle Dispersion Liquid>

| Fine particles (Aerosil R972V produced by Nippon Aerosil Co., Ltd.) | 11 mass parts |
|---|---|
| Ethanol | 89 mass parts |

The above were dispersed by a Manton-Gaulin homogenizer after being stirred and mixed for 50 minutes by a dissolver.

<Fine Particle Additive Liquid>

Based on the following composition, the above fine particle dispersion liquid was slowly added into a dissolution tank containing methylene chloride while being sufficiently stirred. The dispersion liquid was further dispersed by an Attritor so that the particle diameter of secondary particles became a predetermined size. This was filtered using a Fine Met NF produced by Nippon Seisen Co., Ltd. to prepare a fine particle additive liquid.

| Methylene chloride | 99 mass parts |
|---|---|
| Fine particle dispersion liquid 1 | 5 mass parts |

<Main Dope Solution>

A main dope solution of the following composition was prepared. First, methylene chloride and ethanol were added into a pressure dissolution tank. Cellulose acetate was poured into the pressure dissolution tank containing a solvent while being stirred. This was heated and completely dissolved while being stirred. This was filtered using Azumi Filter Paper No. 244 produced by Azumi Filter Paper Co., Ltd. to prepare the main dope solution. Note that compounds synthesized by the following synthesis examples were used as a sugar ester compound and an ester compound. Further, the following compound was used as a compound (B).

<Composition of Main Dope Solution>

| | |
|---|---|
| Methylene Chloride | 340 mass parts |
| Ethanol | 64 mass parts |
| Cellulose acetate propionate (acetyl group substitution degree of 1.39, propionyl group substitution degree of 0.50, total substitution degree of 1.89) | 100 mass parts |
| Compound (B) | 5.0 mass parts |
| Sugar ester compound | 5.0 mass parts |
| Ester compound | 2.5 mass parts |
| Fine particle additive liquid 1 | 1 mass part |

[Chemical Formula 6]

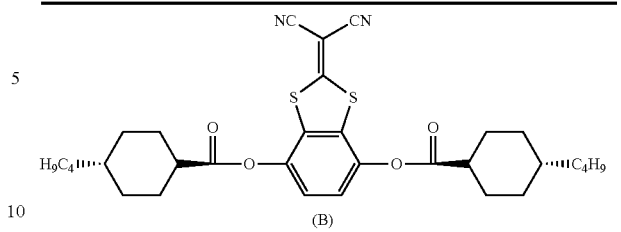

(Synthesis of Sugar Ester Compound)

A sugar ester compound was synthesized by the following process.

[Chemical Formula 7]

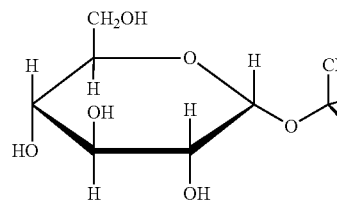 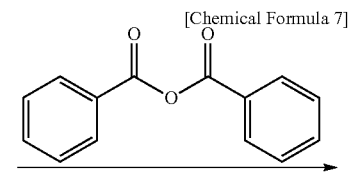

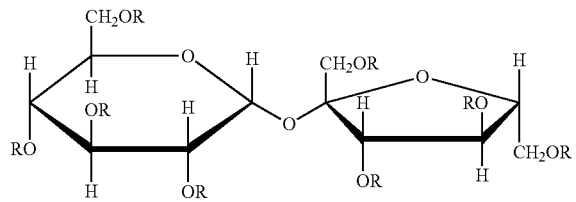

| | R | (SUBSTITUTION NUMBER) |
|---|---|---|
| EXEMPLIFIED COMPOUND A-1 | —H | 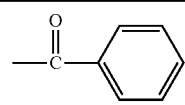 |
| | (0) | (8) |
| EXEMPLIFIED COMPOUND A-2 | —H | 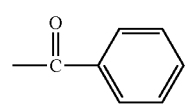 |
| | (1) | (7) |
| EXEMPLIFIED COMPOUND A-3 | —H | 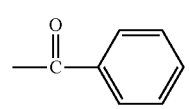 |
| | (2) | (6) |
| EXEMPLIFIED COMPOUND A-4 | —H | 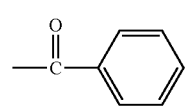 |
| | (3) | (5) |
| EXEMPLIFIED COMPOUND A-5 | —H | 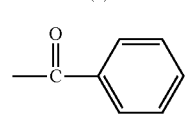 |
| | (4) | (4) |

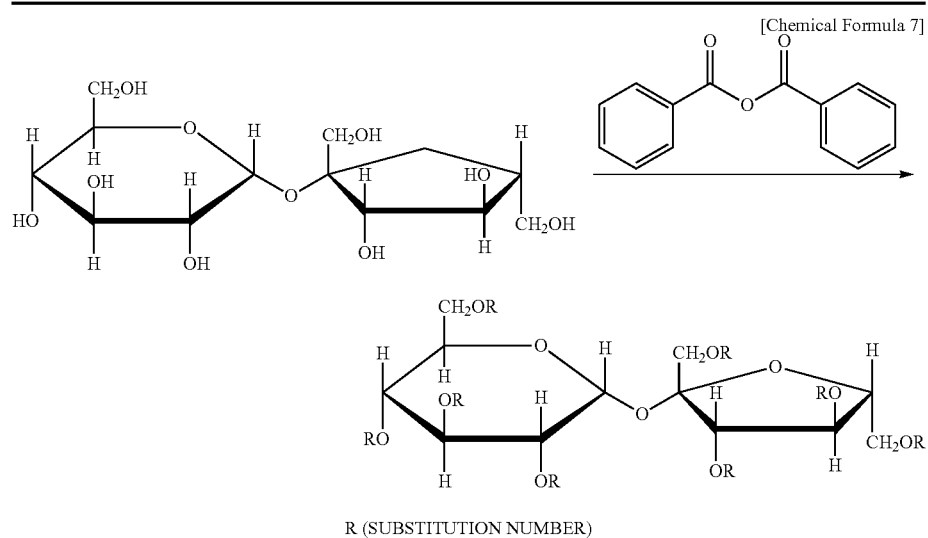

R (SUBSTITUTION NUMBER)

34.2 g (0.1 mol) of sucrose, 180.8 g (0.6 mol) of anhydrous benzoic acid, 379.7 g (4.8 mol) of pyridine were charged into a four-head flask provided with a stirring device, a reflux cooler, a thermometer and a nitrogen gas inlet pipe and heated while nitrogen gas was bubbled from the nitrogen gas inlet pipe under stirring, and an esterification reaction was carried out at 70° C. for 5 hours.

Subsequently, the inside of the flask was decompressed to $4 \times 10^2$ Pa or less. After excess pyridine was distilled away at 60° C., the inside of the flask was decompressed to $1.3 \times 10$ Pa or less and heated to 120° C., thereby distilling away most of anhydrous benzoic acid and produced benzoic acid.

Finally, 100 g of water was added to a collected toluene layer. After being washed with water at an ambient temperature for 30 minutes, the toluene layer was collected and toluene was distilled away at 60° C. under decompression ($4 \times 10^2$ Pa or less), thereby obtaining a mixture of compounds A-1, A-2, A-3, A-4 and A-5 (sugar ester compound).

When the obtained mixture was analyzed by HPLC and LC-MASS, there were 1.3 mass % of A-1, 13.4 mass % of A-2, 13.1 mass % of A-3, 31.7 mass % of A-4 and 40.5 mass % of A-5. An average degree of substitution was 5.5.

<Measurement Conditions of HPLC-MS>
1) LC Part
Device: column oven (JASCO CO-965), detector (JASCO UV-970-240 nm), pump (JASCO PU-980), degasser (JASCO DG-980-50) produced by Jasco Corporation
Column: Inertsil ODS-3, particle diameter of 5 μm, 4.6× 250 mm (produced by GL Sciences Inc.)
Column Temperature: 40° C.
Flow velocity: 1 ml/min
Mobile Phase: THF (1% acetic acid): $H_2O$ (50:50)
Injection amount: 3 μl
2) MS Part
Device: LCQ DECA (Produced by Thermo Quest)
Ionization method: electrospray ionization (ESI) method
Spray voltage: 5 kV
Capillary temperature: 180° C.
Vaporizer temperature: 450° C.
(Synthesis of Ester Compound)

An ester compound was synthesized by the following process.

251 g of 1,2-propylene glycol, 278 g of anhydrous phthalic acid, 91 g of adipic acid, 610 g of benzoic acid, 0.191 g of tetraisopropyl titanate as an esterification catalyst were charged into a four-mouth flask of 2 L provided with a thermometer, a stirrer and a reflux cooling pipe and gradually heated until 230° C. was reached in a nitrogen gas flow while being stirred. A dehydration condensation reaction was carried out for 15 hours and unreacted 1,2-propylene glycol was decompressed and distilled away at 200° C. after the reaction was finished, whereby an ester compound was obtained. The ester compound included an ester of benzoic acid at an end of a polyester chain formed by the condensation of 1,2-propylene glycol, anhydrous phthalic acid and adipic acid. An acid number of the ester compound was 0.10 and a number average molecular weight thereof was 450.

Subsequently, using an endless belt casting device, the ester compound was uniformly cast onto a stainless steel belt support.

In the endless belt casting device, the above main dope solution was uniformly cast onto the stainless steel belt support. A solvent was evaporated on the stainless steel belt support until a remaining solvent amount in the cast long film became 75%, the long film was peeled from the stainless steel belt support, and the drying of the long film was finished while the long film was conveyed by a multitude of rolls, whereby the long film B1 having a width of 1000 mm was obtained. A film thickness of the long film B1 at this time was 100 μm.

(Long Film B2)

The long film B2 was obtained in the same manner as for the long film B1 except that a film thickness during casting was appropriately adjusted so that a thickness after a drying step became 50 μm in the method for producing the long film B1.

(Long Film C1)

The long film C1 was a polycarbonate-based resin film and produced by the following method.

<Dope Composition>

| | |
|---|---|
| Polycarbonate resin (viscosity average molecular weight of 40,000, bisphenol A type) | 100 mass parts |
| 2-(2'hydroxy-3',5'-di-t-butylphenyl)-benzotriazol | 1.0 mass part |
| Methylene chloride | 430 mass parts |
| Methanol | 90 mass parts |

The above composition was poured into a sealed container and completely dissolved while being kept at 80° C. under pressure and stirred, whereby a dope composition was obtained.

Subsequently, this dope composition was filtered, cooled and kept at 33° C., uniformly cast onto a stainless steel band and dried at 33° C. for 5 minutes. Thereafter, a drying time was adjusted at 65° C. to attain a retardation of 5 nm. After being peeled from the stainless steel band, the drying was completed while the dope composition was conveyed by a multitude of rolls, whereby the long film C1 having a film thickness of 85 μm and a width of 1000 mm was obtained.

(Long Film C2)

The long film C2 was obtained in the same manner as for the long film C1 except that a film thickness during casting was appropriately adjusted so that a thickness after melting became 40 μm in the method for producing the long film C1.

<Production of Long Stretched Film>

In the oblique stretching step and the winding step, the long films A1 to C2 were stretched and wound into a roll by oblique stretching devices (T1 to T5) adjusted to satisfy the following conditions.

(Stretching Device T1)

The stretching device T1 is shown in FIG. 2. In the stretching device T1, each gripping tool travel support tool includes the same number of gripping tools (a total of 800). The angle (stretching angle) between the delivering direction of the long film and the winding direction was set at 47°. The length of the route of the inner gripping tool travel support tool Ri from the grip start point to the grip release point was 18 m and the entire length was 43 m. The length of the route of the outer gripping tool travel support tool Ro from the grip start point to the grip release point was 19 m and the entire length was 43 m. Specifically, the entire length of the route of the inner gripping tool travel support tool Ri and that of the route of the outer gripping tool travel support tool Ro were equal. The straight line connecting the grip release points of the stretching device T1 was not parallel to the width direction of the long stretched film and the angle θ was 63°.

End parts of the long stretched film discharged from the stretching device T1 were trimmed so that the final width of the long stretched film became 1600 mm. Thereafter, the long stretched film was wound into a roll with a take-up tension of 200 (N/m) by the winding device provided at the exit.

(Stretching Device T2)

The stretching device T2 is shown in FIG. 3. The stretching device T2 is configured similarly to the stretching device T1 except that the patterns of the gripping tool travel support tools were so adjusted that the straight line connecting the grip release points became parallel to the width direction of the long stretched film.

(Stretching Device T3)

The stretching device T3 is shown in FIG. 4. In the stretching device T3, the entire length of the route of the outer gripping tool travel support tool Ro is longer than that of the route of the inner gripping tool travel support tool Ri. Further, the stretching device T3 is configured similarly to the stretching device T1 except in adopting the speed adjusting mechanism for increasing the traveling speed of the gripping tools having released the grip at the grip release point in the route of the outer gripping tool travel support tool Ro. Specifically, the stretching device D3 is so formed that the entire length of the route of the inner gripping tool travel support tool Ri is 44 m and shorter than that of the route of the outer gripping tool travel support tool Ro (45 m). Thus, there is a possibility that the combinations of the gripping tools constituting the gripping tool pairs change in each lap. Therefore, the speed of the gripping tools having released the grip is increased in the route of the outer gripping tool travel support tool Ro for adjustment so that the gripping tools constantly form the gripping tool pairs with the same gripping tools paired last time.

(Stretching Device T4)

A stretching device T4 (not shown) is configured similarly to the stretching device T3 except that the patterns of the gripping tool travel support tools are adjusted so that the straight line connecting the grip release points becomes parallel to the width direction of the long stretched film.

(Stretching Device T5)

Figure 6:
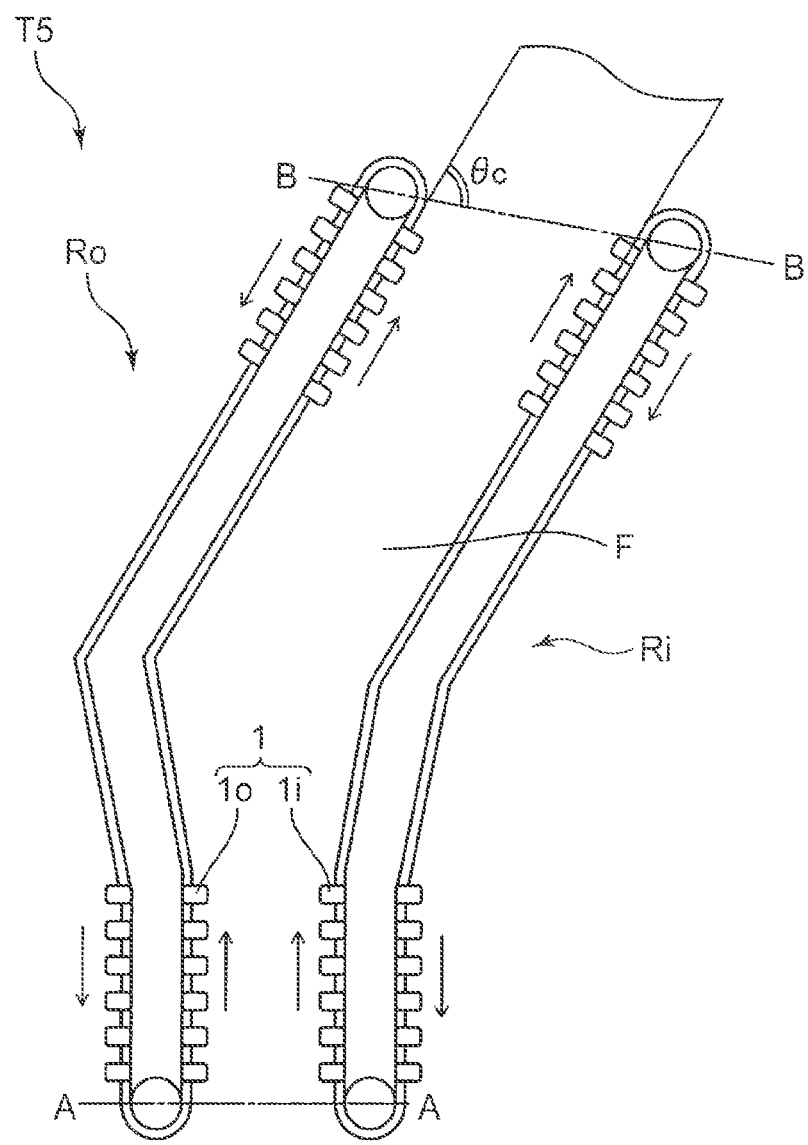
FIG. 6 is a schematic diagram of a stretching device used in Comparative Examples.

The stretching device T5 is shown in FIG. 6. As shown in FIG. 6, in the stretching device T5, the entire length of the route of the inner gripping tool travel support tool Ri is longer than that of the route of the outer gripping tool travel support tool Ro. Specifically, the entire length of the route of the inner gripping tool travel support tool Ri and that of the route of the outer gripping tool travel support tool Ro are not equal. Further, the straight line B connecting the grip release points is not parallel to the width direction of the long film F. Specifically, an angle θc between the straight line B and the traveling direction of the long stretched film F is 62°. Further, the route of the inner gripping tool travel support tool Ri includes 830 gripping tools 1 and the route of the outer gripping tool travel support tool Ro includes 780 gripping tools 1. Specifically, the number of the gripping tools provided in the route of the inner gripping tool travel support tool Ri and that of the gripping tools provided in the route of the outer gripping tool travel support tool Ro are not equal.

Examples 1 to 12, Comparative Examples 1 to 3

Based on combinations shown in TABLE-1, the long films A1 to C1 were stretched by the stretching devices T1 to T5 to produce long stretched films 1 to 15 (Examples 1 to 12, Comparative Examples 1 to 3). The traveling speed of the gripping tools at this time was set at 20 m/min.

Further, temperature conditions of a tenter oven when the long film A was used were adjusted as follows: 140° C. in the preheating zone, 140° C. in the stretching zone, 137° C. in the thermal fixing zone and 80° C. in the cooling zone. Further, temperature conditions of the tenter oven when the long film B was used were adjusted as follows: 180° C. in the preheating zone, 180° C. in the stretching zone, 177° C. in the thermal fixing zone and 90° C. in the cooling zone. Further, temperature conditions of the tenter oven when the long film C was used were adjusted as follows: 160° C. in the preheating zone, 160° C. in the stretching zone, 157° C. in the thermal fixing zone and 80° C. in the cooling zone.

Examples 13 to 18, Comparative Examples 4 to 6

Based on combinations shown in TABLE-2, the long films A1 to C1 were stretched by the stretching devices T2, T4 and T5 to produce long stretched films 16 to 24 (Examples 13 to 18, Comparative Examples 4 to 6). The traveling speed of the gripping tools at this time was set at 100 m/min. Further, temperature conditions of the tenter oven when the long film A was used were adjusted as follows: 150° C. in the preheating zone, 148° C. in the stretching zone, 144° C. in the thermal fixing zone and 90° C. in the cooling zone. Further, temperature conditions of the tenter oven when the long film B was used were adjusted as follows: 187° C. in the preheating zone, 187° C. in the stretching zone, 181° C. in the thermal fixing zone and 95° C. in the cooling zone. Further, temperature conditions of the tenter oven when the long film C was used were adjusted as follows: 166° C. in the preheating zone, 166° C. in the stretching zone, 164° C. in the thermal fixing zone and 90° C. in the cooling zone.

Examples 19 to 24, Comparative Examples 7 to 9

Based on combinations shown in TABLE-3, the long films A2 to C2 were stretched by the stretching devices T2, T4 and T5 to produce long stretched films 25 to 33 (Examples 19 to 24, Comparative Examples 7 to 9). The traveling speed of the gripping tools at this time was set at 20 m/min.

Example 25

A polyvinyl alcohol film having a thickness of 120 μm was uniaxially stretched (temperature of 110° C., stretch ratio of 5).

This was immersed in an aqueous solution containing 0.075 g of iodine, 5 g of potassium iodide and 100 g of water for 60 seconds and, subsequently, immersed in an aqueous solution of 68° C. containing 6 g of potassium iodide, 7.5 g of boric acid and 100 g of water. This was washed with water and dried to obtain a polarizer.

The produced long stretched film 1 was bonded to one surface of the above polarizer using a 5% aqueous solution of polyvinyl alcohol as an adhesive. At that time, the film was so bonded that a transmission axis of the polarizer and a slow axis of the produced long stretched film (λ/4 phase difference film) form 45°. A Konica Minolta tack film KC6UA (produced by Konica Minolta Opto Products Co., Ltd.) was similarly bonded to the other surface of the polarizer after an alkali saponification treatment to produce the circular polarizing plate 1.

(Production of Organic EL Display)

A reflecting electrode made of chromium and having a thickness of 80 nm was formed on a glass substrate by sputtering, ITO (indium tin oxide) was formed into a film having a thickness of 40 nm as a positive electrode on the reflecting electrode by sputtering, poly(3,4-ethylenedioxythiophene)-polystyrenesulfonate (PEDOT:PSS) was formed into a hole transport layer having a thickness of 80 nm on the positive electrode by sputtering, and luminous layers of RGB having a film thickness of 100 nm were formed on the hole transport layer using a shadow mask.

Tris(8-hydroxynolinato)aluminum ($Alq_3$) as a host and a light-emitting compound [4-(dicyanomethylene)-2-methyl-6-(p-dimethylaminostyryl)-4H-pyran] (DCM) were co-deposited (mass ratio of 99:1) to form a red luminous layer having a thickness of 100 nm. $Alq_3$ as a host and a light-emitting compound Coumarin 6 were co-deposited (mass ratio of 99:1) to form a green luminous layer having a thickness of 100 nm. BAlq shown below as a host and a light-emitting compound Perylene were co-deposited (mass ratio of 90:10) to form a blue luminous layer having a thickness of 100 nm.

[Chemical Formula 8]

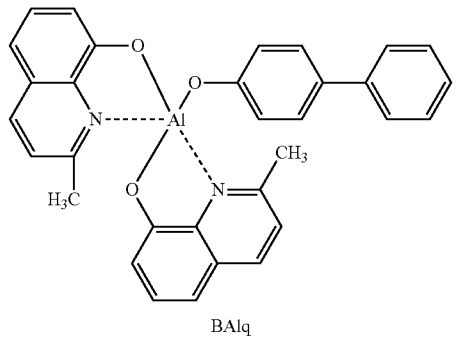

BAlq

Further, a film of calcium having a thickness of 4 nm was formed as a first negative electrode, into which electrons can be efficiently injected and which has a low work function, on the luminous layers by vacuum deposition, and a film of aluminum having a thickness of 2 nm was formed as a second negative electrode on the first negative electrode. Here, aluminum used as the second negative electrode functions to prevent chemical alteration of calcium as the first negative electrode when a transparent electrode is formed on the second negative electrode by sputtering. An organic luminous layer was obtained in this way. Subsequently, a transparent conductive film having a thickness of 80 nm was formed on the negative electrode by sputtering. Here, ITO was used as the transparent conductive film. Further, a film of silicon nitride having a thickness of 200 nm was formed as an insulating film on the transparent conductive film by a CVD method (chemical deposition method).

A light emission area of the formed organic EL element was 1296 mm×784 mm. Further, a front luminance when a direct-current voltage of 6 V was applied to this organic EL element was 1200 cd/m². The front luminance was measured by measuring a 2-degree viewing angle front luminance in a visible light wavelength range of 430 to 480 nm such that an optical axis of a spectral radiance meter coincides with a normal from a light emitting surface using the spectral radiance meter (CS-1000) produced by Konica Minolta Sensing Inc. and calculating an integrated intensity.

The circular polarizing plate 1 was so fixed onto the insulating film of the formed organic EL element using an adhesive that a surface of the produced long stretched film (λ/4 phase difference film) faces a surface of the insulating film, thereby forming the organic EL display 1 (Example 25).

Examples 26 to 48, Comparative Examples 10 to 18

By a method similar to Example 25, circular polarizing plates 2 to 33 and organic EL displays 2 to 33 were produced using long stretched films 2 to 33 (Examples 26 to 48, Comparative Examples 10 to 18). The used long stretched films and the obtained organic EL displays are shown in TABLE-4 and TABLE-5.

Reference Example 1

A polarizing plate on a visible side of a commercially available liquid crystal display panel (produced by Sony Corporation: BRAVIA KDL-26J5) was peeled and bonded to the formed circular polarizing plate 13, thereby producing a liquid crystal panel 201. Subsequently, the liquid crystal panel was set in a liquid crystal television to produce a liquid crystal display device 301.

Reference Examples 2 and 3

Liquid crystal display devices 302 and 303 were produced in the same manner as in the production of the above liquid crystal display device 301 except that the circular polarizing plate 13 was changed to the circular polarizing plates 14 and 15. The used long stretched films and obtained liquid crystal display devices are shown in TABLE-6.

<Evaluation>

The obtained long stretched films were evaluated as follows.

(Orientation Angle and Variation of Orientation Angle in Width Direction)

Orientation angles of the produced long stretched films 1 to 33 were measured using a phase difference measuring device (KOBRA-WXK produced by Oji Scientific Instruments). As an evaluation method, the long stretched film was measured at an interval of 50 mm in the film width direction of the long stretched film and an average of the total data was calculated. Further, a difference between a maximum value and a minimum value of all measurement values was evaluated as a variation of the orientation angle in the width direction.

(Evaluation Criteria of Variation of Orientation Angle in Width Direction)

⊚: Variation of the orientation angle in the width direction is below 0.4°

○: Variation of the orientation angle in the width direction is equal to or above 0.4° and below 0.6°

Δ: Variation of the orientation angle in the width direction is equal to or above 0.6° and below 1.0°

×: Variation of the orientation angle in the width direction is equal to or above 1.0°

(In-Plane Retardation and Widthwise Distribution of In-Plane Retardation)

In-plane retardations of the produced long stretched films 1 to 33 were measured using the phase difference measuring device (KOBRA-WXK produced by Oji Scientific Instruments). As an evaluation method, the long stretched film was measured at an interval of 50 mm in the film width direction of the long stretched film and an evaluation was carried out.

The obtained organic EL displays and liquid crystal display devices were evaluated as follows.

(Color Unevenness)

Color unevenness on the entire display in black display in the above produced organic EL displays and liquid crystal display devices was visually evaluated based on the following criteria.

(Evaluation Criteria on Color Unevenness)

⊚: Tinge does not differ from position to position on the produced organic EL device or liquid crystal display device.

○: Tinge differs from position to position on the produced organic EL display or liquid crystal display device, but such a difference is not problematic in use.

Δ: Tinge differs from position to position on the produced organic EL display or liquid crystal display device, and the organic EL display or liquid crystal display device cannot be used as a product.

×: Tinge largely differs from position to position on the produced organic EL device or liquid crystal display device, and the organic EL display or liquid crystal display device cannot be used as a product.

The summary of the above various long stretched films, organic EL displays and liquid crystal display device and results of various evaluations are collectively shown in TABLE-1 to TABLE-6.

TABLE-1

| | Obtained Long Stretched Film | Used Stretching Device | Used Long Film | Stretch Ratio | Film Thickness (μm) | Orientation Angle (°) | In-Plane Re (nm) | Variation of Widthwise Orientation Angle |
|---|---|---|---|---|---|---|---|---|
| Example 1 | Long Stretched Film 1 | T1 | A1 | 2.0x | 52 | 45 | 140 | ○ |
| Example 2 | Long Stretched Film 2 | T1 | B1 | 2.0x | 52 | 45 | 140 | ○ |
| Example 3 | Long Stretched Film 3 | T1 | C1 | 2.0x | 52 | 45 | 140 | ○ |
| Example 4 | Long Stretched Film 4 | T2 | A1 | 2.0x | 52 | 45 | 140 | ⊚ |
| Example 5 | Long Stretched Film 5 | T2 | B1 | 2.0x | 52 | 45 | 140 | ⊚ |
| Example 6 | Long Stretched Film 6 | T2 | C1 | 2.0x | 52 | 45 | 140 | ⊚ |
| Example 7 | Long Stretched Film 7 | T3 | A1 | 2.0x | 52 | 45 | 140 | ○ |
| Example 8 | Long Stretched Film 8 | T3 | B1 | 2.0x | 52 | 45 | 140 | ○ |
| Example 9 | Long Stretched Film 9 | T3 | C1 | 2.0x | 52 | 45 | 140 | ○ |
| Example 10 | Long Stretched Film 10 | T4 | A1 | 2.0x | 52 | 45 | 140 | ⊚ |
| Example 11 | Long Stretched Film 11 | T4 | B1 | 2.0x | 52 | 45 | 140 | ⊚ |
| Example 12 | Long Stretched Film 12 | T4 | C1 | 2.0x | 52 | 45 | 140 | ⊚ |
| C. Example 1 | Long Stretched Film 13 | T5 | A1 | 2.0x | 52 | 45 | 140 | Δ |
| C. Example 2 | Long Stretched Film 14 | T5 | B1 | 2.0x | 52 | 45 | 140 | Δ |
| C. Example 3 | Long Stretched Film 15 | T5 | C1 | 2.0x | 52 | 45 | 140 | Δ |

TABLE-2

| | Obtained Long Stretched Film | Used Stretching Device | Used Long Film | Stretch Ratio | Film Thickness (μm) | Orientation Angle (°) | In-Plane Re (nm) | Variation of Widthwise Orientation Angle |
|---|---|---|---|---|---|---|---|---|
| Example 13 | Long Stretched Film 16 | T2 | A1 | 2.0x | 52 | 45 | 140 | ⊚ |
| Example 14 | Long Stretched Film 17 | T2 | B1 | 2.0x | 52 | 45 | 140 | ○ |
| Example 15 | Long Stretched Film 18 | T2 | C1 | 2.0x | 52 | 45 | 140 | ○ |
| Example 16 | Long Stretched Film 19 | T4 | A1 | 2.0x | 52 | 45 | 140 | ⊚ |
| Example 17 | Long Stretched Film 20 | T4 | B1 | 2.0x | 52 | 45 | 140 | ○ |
| Example 18 | Long Stretched Film 21 | T4 | C1 | 2.0x | 52 | 45 | 140 | ○ |

TABLE-2-continued

| | Obtained Long Stretched Film | Used Stretching Device | Used Long Film | Stretch Ratio | Film Thickness (μm) | Orientation Angle (°) | In-Plane Re (nm) | Variation of Widthwise Orientation Angle |
|---|---|---|---|---|---|---|---|---|
| C. Example 4 | Long Stretched Film 22 | T5 | A1 | 2.0x | 52 | 45 | 140 | Δ |
| C. Example 5 | Long Stretched Film 23 | T5 | B1 | 2.0x | 52 | 45 | 140 | X |
| C. Example 6 | Long Stretched Film 24 | T5 | C1 | 2.0x | 52 | 45 | 140 | X |

TABLE-3

| | Obtained Long Stretched Film | Used Stretching Device | Used Long Film | Stretch Ratio | Film Thickness (μm) | Orientation Angle (°) | In-Plane Re (m) | Variation of Widthwise Orientation Angle |
|---|---|---|---|---|---|---|---|---|
| Example 19 | Long Stretched Film 25 | T2 | A2 | 2.0x | 25 | 45 | 140 | ◉ |
| Example 20 | Long Stretched Film 26 | T2 | B2 | 2.0x | 25 | 45 | 140 | ○ |
| Example 21 | Long Stretched Film 27 | T2 | C2 | 2.0x | 25 | 45 | 140 | ○ |
| Example 22 | Long Stretched Film 28 | T4 | A2 | 2.0x | 25 | 45 | 140 | ◉ |
| Example 23 | Long Stretched Film 29 | T4 | B2 | 2.0x | 25 | 45 | 140 | ○ |
| Example 24 | Long Stretched Film 30 | T4 | C2 | 2.0x | 25 | 45 | 140 | ○ |
| C. Example 7 | Long Stretched Film 31 | T5 | A2 | 2.0x | 25 | 45 | 140 | Δ |
| C. Example 8 | Long Stretched Film 32 | T5 | B2 | 2.0x | 25 | 45 | 140 | X |
| C. Example 9 | Long Stretched Film 33 | T5 | C2 | 2.0x | 25 | 45 | 140 | X |

TABLE 4

| | Obtained Image Display Device | Obtained Circular Polarizing Plate | Used Long Stretched Film | Color Unevenness |
|---|---|---|---|---|
| Example 25 | Organic EL Display 1 | Circular Polarizing Plate 1 | Long Stretched Film 1 | ○ |
| Example 26 | Organic EL Display 2 | Circular Polarizing Plate 2 | Long Stretched Film 2 | ○ |
| Example 27 | Organic EL Display 3 | Circular Polarizing Plate 3 | Long Stretched Film 3 | ○ |
| Example 28 | Organic EL Display 4 | Circular Polarizing Plate 4 | Long Stretched Film 4 | ◉ |
| Example 29 | Organic EL Display 5 | Circular Polarizing Plate 5 | Long Stretched Film 5 | ◉ |
| Example 30 | Organic EL Display 6 | Circular Polarizing Plate 6 | Long Stretched Film 6 | ◉ |
| Example 31 | Organic EL Display 7 | Circular Polarizing Plate 7 | Long Stretched Film 7 | ○ |
| Example 32 | Organic EL Display 8 | Circular Polarizing Plate 8 | Long Stretched Film 8 | ○ |
| Example 33 | Organic EL Display 9 | Circular Polarizing Plate 9 | Long Stretched Film 9 | ○ |
| Example 34 | Organic EL Display 10 | Circular Polarizing Plate 10 | Long Stretched Film 10 | ◉ |
| Example 35 | Organic EL Display 11 | Circular Polarizing Plate 11 | Long Stretched Film 11 | ◉ |
| Example 36 | Organic EL Display 12 | Circular Polarizing Plate 12 | Long Stretched Film 12 | ◉ |
| C. Example 10 | Organic EL Display 13 | Circular Polarizing Plate 13 | Long Stretched Film 13 | Δ |
| C. Example 11 | Organic EL Display 14 | Circular Polarizing Plate 14 | Long Stretched Film 14 | Δ |
| C. Example 12 | Organic EL Display 15 | Circular Polarizing Plate 15 | Long Stretched Film 15 | Δ |

TABLE 5

| | Obtained Image Display Device | Obtained Circular Polarizing Plate | Used Long Stretched Film | Color Unevenness |
|---|---|---|---|---|
| Example 37 | Organic EL Display 16 | Circular Polarizing Plate 16 | Long Stretched Film 16 | ◉ |
| Example 38 | Organic EL Display 17 | Circular Polarizing Plate 17 | Long Stretched Film 17 | ○ |
| Example 39 | Organic EL Display 18 | Circular Polarizing Plate 18 | Long Stretched Film 18 | ○ |
| Example 40 | Organic EL Display 19 | Circular Polarizing Plate 19 | Long Stretched Film 19 | ◉ |
| Example 41 | Organic EL Display 20 | Circular Polarizing Plate 20 | Long Stretched Film 20 | ○ |
| Example 42 | Organic EL Display 21 | Circular Polarizing Plate 21 | Long Stretched Film 21 | ○ |
| C. Example 13 | Organic EL Display 22 | Circular Polarizing Plate 22 | Long Stretched Film 22 | Δ |
| C. Example 14 | Organic EL Display 23 | Circular Polarizing Plate 23 | Long Stretched Film 23 | X |
| C. Example 15 | Organic EL Display 24 | Circular Polarizing Plate 24 | Long Stretched Film 24 | X |
| Example 43 | Organic EL Display 25 | Circular Polarizing Plate 25 | Long Stretched Film 25 | ◉ |
| Example 44 | Organic EL Display 26 | Circular Polarizing Plate 26 | Long Stretched Film 26 | ○ |
| Example 45 | Organic EL Display 27 | Circular Polarizing Plate 27 | Long Stretched Film 27 | ○ |
| Example 46 | Organic EL Display 28 | Circular Polarizing Plate 28 | Long Stretched Film 28 | ◉ |
| Example 47 | Organic EL Display 29 | Circular Polarizing Plate 29 | Long Stretched Film 29 | ○ |
| Example 48 | Organic EL Display 30 | Circular Polarizing Plate 30 | Long Stretched Film 30 | ○ |
| C. Example 16 | Organic EL Display 31 | Circular Polarizing Plate 31 | Long Stretched Film 31 | Δ |
| C. Example 17 | Organic EL Display 32 | Circular Polarizing Plate 32 | Long Stretched Film 32 | X |
| C. Example 18 | Organic EL Display 33 | Circular Polarizing Plate 33 | Long Stretched Film 33 | X |

TABLE 6

| | Obtained Image Display Device | Obtained Circular Polarizing Plate | Used Long Stretched Film | Color Unevenness |
|---|---|---|---|---|
| R. Example 1 | Liquid Crystal Display Device 301 | Circular Polarizing Plate 13 | Long Stretched Film 13 | ◯ |
| R. Example 2 | Liquid Crystal Display Device 302 | Circular Polarizing Plate 14 | Long Stretched Film 14 | ◯ |
| R. Example 3 | Liquid Crystal Display Device 303 | Circular Polarizing Plate 15 | Long Stretched Film 15 | ◯ |
| C. Example 10 | Organic EL Display 13 | Circular Polarizing Plate 13 | Long Stretched Film 13 | Δ |
| C. Example 11 | Organic EL Display 14 | Circular Polarizing Plate 14 | Long Stretched Film 14 | Δ |
| C. Example 12 | Organic EL Display 15 | Circular Polarizing Plate 15 | Long Stretched Film 15 | Δ |

As shown in TABLE-1, the long stretched films 1 to 12 corresponding to Examples 1 to 12 were good as compared with the long stretched films 13 to 15 corresponding to Comparative Examples 1 to 3 since the variation of the orientation angle in the width direction was below ±0.6°. Particularly, the long stretched films 4, 5, 6, 10, 11 and 12 obtained using the stretching devices T2, T4 in which the gripping tools released the long stretched film such that the straight line connecting the grip release points was parallel to the width direction of the long stretched film were good since the variation of the orientation angle in the width direction was below ±0.4°.

As shown in TABLE-2, the long stretched films 16 to 21 corresponding to Examples 13 to 18 were good as compared with the long stretched films 22 to 24 corresponding to Comparative Examples 4 to 6 since the variation of the orientation angle in the width direction was below ±0.6°. Particularly, the long stretched films 16, 19 obtained using the norbornene-based resin as the thermoplastic resin were good since the variation of the orientation angle in the width direction was below ±0.4°.

As shown in TABLE-3, the long stretched films 25 to 30 corresponding to Examples 19 to 24 were good as compared with the long stretched films 31 to 33 corresponding to Comparative Examples 7 to 9 since the variation of the orientation angle in the width direction was below ±0.6°. Particularly, the long stretched films 25, 30 obtained using the norbornene-based resin as the thermoplastic resin were good since the variation of the orientation angle in the width direction was below ±0.4°.

As shown in TABLE-4, the organic EL displays 1 to 12 corresponding to Examples 25 to 36 were good as compared with the organic EL displays 13 to 15 corresponding to Comparative Examples 10 to 12 since there was no difference in tinge or such a difference in tinge as not to cause any problem as a product. Particularly, the organic EL displays 4 to 6, 10 to 12 obtained using the stretching devices T2, T4 in which the gripping tools released the long stretched film such that the straight line connecting the grip release points was parallel to the width direction of the long stretched film were good since there was no difference in tinge.

As shown in TABLE-5, the organic EL displays 16 to 21 and 25 to 30 corresponding to Examples 37 to 48 were good as compared with the organic EL displays 22 to 24 and the organic EL displays 31 to 33 corresponding to Comparative Examples 13 to 18 since there was no difference in tinge or such a difference in tinge as not to cause any problem as a product. Particularly, the organic EL displays 16, 19, 25 and 28 obtained using the norbornene-based resin as the thermoplastic resin were good since there was no difference in tinge.

As shown in TABLE-6, the liquid crystal display devices 301 to 303 corresponding to Reference Examples 1 to 3 had little difference in tinge as compared with the organic EL displays 13 to 15 corresponding to Comparative Examples 10 to 12. These problems were found to be observed when the long stretched film was applied to the organic EL displays.

The invention claimed is:

1. A method for producing a long stretched film, comprising at least a step of forming a long film made of thermoplastic resin, an oblique stretching step of delivering the long film in a specific direction different from a winding direction of a long stretched film after stretching and obliquely stretching the long film in a direction of an angle exceeding 0° and below 90° with respect to a width direction while gripping and conveying opposite end parts of the long film by a plurality of gripping tools of an oblique stretching device and a winding step of winding the long stretched film after the oblique stretching step, wherein:
    the oblique stretching device includes gripping tool travel support tools at opposite sides of the traveling long film;
    each of the gripping tool travel support tools at the opposite sides includes a plurality of gripping tools;
    the same number of the gripping tools are provided at the opposite sides;
    in the oblique stretching step, travel route lengths and traveling speeds at the opposite sides of the long stretched film per lap, from the grip start points when the long film is gripped by the plurality of gripping tools of the gripping tool travel support tools at an entrance of the oblique stretching device to the grip start points at the entrance of the oblique stretching device by way of grip release points where the long film is released at an exit of the oblique stretching device, are equal;
    the gripping tool traveling along the route of an inner gripping tool travel support tool reaches the grip release point and releases the long stretched film earlier than the gripping tool traveling along the route of an outer gripping tool travel support tool;
    an adjusting gear is provided in the inner gripping tool travel support tool to make the length of the route of the inner gripping tool travel support tool equal to that of the route of the outer gripping tool travel support tool; and
    a combination of the gripping tools forming a gripping tool pair is constantly the same at grip start points where the long film is gripped by the gripping tools.

2. A method for producing a long stretched film according to claim 1, wherein, in the oblique stretching step, a straight line connecting the grip release points where the gripping tools release the long stretched film is parallel to the width direction of the long stretched film.

3. A method for producing a long stretched film according to claim 1, wherein an in-plane retardation of the long stretched film is 120 to 160 nm.

4. A method for producing a long stretched film according to claim 1, wherein the thermoplastic resin used is norbornene-based resin.

5. A method for producing a long stretched film according to claim 1, wherein a film thickness of the obtained long stretched film is 10 to 35 μm.

6. A method for producing a long stretched film, comprising at least a step of forming a long film made of thermoplastic resin, an oblique stretching step of delivering the long film in a specific direction different from a winding direction of a long stretched film after stretching and obliquely stretching the long film in a direction of an angle exceeding 0° and below 90° with respect to a width direction while gripping and conveying opposite end parts of the long film by a plurality of gripping tools of an oblique stretching device and a winding step of winding the long stretched film after the oblique stretching step, wherein:

the oblique stretching device includes gripping tool travel support tools at opposite sides of the traveling long film;

each of the gripping tool travel support tools at the opposite sides includes a plurality of gripping tools;

the same number of the gripping tools are provided at the opposite sides;

in the oblique stretching step, the traveling speeds of the gripping tools are increased and decreased until the gripping tools grip the long film again after releasing the long stretched film so that the gripping tools of the same combination are aligned at the grip start points, and wherein the traveling speeds of the gripping tools at the opposite sides are different from each other after releasing the film and before gripping the film again; and a combination of the gripping tools forming a gripping tool pair is constantly the same at grip start points where the long film is gripped by the gripping tools.

7. A method for producing a long stretched film according to claim 6, wherein, in the oblique stretching step, a straight line connecting the grip release points where the gripping tools release the long stretched film is parallel to the width direction of the long stretched film.

8. A method for producing a long stretched film according to claim 6, wherein an in-plane retardation of the long stretched film is 120 to 160 nm.

9. A method for producing a long stretched film according to claim 6, wherein the thermoplastic resin used is norbornene-based resin.

10. A method for producing a long stretched film according to claim 6, wherein a film thickness of the obtained long stretched film is 10 to 35 μm.

* * * * *